US012742857B2

(12) United States Patent
Abdelgawad

(10) Patent No.: US 12,742,857 B2
(45) Date of Patent: Sep. 22, 2026

(54) USING RADAR DATA FOR AUTOMATIC GENERATION OF MACHINE LEARNING TRAINING DATA AND LOCALIZATION

(71) Applicant: TORC Robotics, Inc., Blacksburg, VA (US)

(72) Inventor: Shehabeldin Abdelgawad, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 327 days.

(21) Appl. No.: 18/217,469

(22) Filed: Jun. 30, 2023

(65) Prior Publication Data

US 2025/0004104 A1 Jan. 2, 2025

(51) Int. Cl.

*G01S 7/41* (2006.01)
*G01S 13/89* (2006.01)
*G06N 20/00* (2019.01)
*G06T 7/246* (2017.01)
*G06T 7/50* (2017.01)

(52) U.S. Cl.

CPC .............. *G01S 7/412* (2013.01); *G01S 13/89* (2013.01); *G06N 20/00* (2019.01); *G06T 7/248* (2017.01); *G06T 7/50* (2017.01); *G06T 2207/10028* (2013.01); *G06T 2207/20081* (2013.01); *G06T 2207/30256* (2013.01)

(58) Field of Classification Search

None

See application file for complete search history.

(56) References Cited

U.S. PATENT DOCUMENTS 10,002,537 B2 6/2018 Chen
10,582,137 B1 3/2020 Benemann et al.
11,451,688 B2 9/2022 Benemann et al.
11,810,371 B1 * 11/2023 Zhou .................... G06V 10/774

(Continued)

FOREIGN PATENT DOCUMENTS

CN 103786723 B 7/2015
CN 119165760 A 12/2024

OTHER PUBLICATIONS

International Search Report and Written Opinion dated Sep. 11, 2024, for International Patent Application No. PCT/US2024/034424, 8 pages.

*Primary Examiner* — Resha Desai
*Assistant Examiner* — Brandon James Henson
(74) *Attorney, Agent, or Firm* — Armstrong Teasdale LLP

(57) ABSTRACT

A method comprises identifying a set of radar data captured by at least one autonomous vehicle when the at least one autonomous vehicle was positioned in a lane of a roadway, and respective ground truth localization data of the at least one autonomous vehicle; filtering one or more objects identified via the set of radar data in accordance with an attribute of the one or more objects; generating a map layer to be included within a high definition map; identifying second set of radar data captured by a second autonomous vehicle when the at least one autonomous vehicle was positioned in the lane of the roadway, and respective ground truth localization data of the at least one autonomous vehicle; and localizing the second autonomous vehicle by executing a matching protocol to match an object within the second set of radar data with an object within the map layer.

17 Claims, 10 Drawing Sheets

(56) References Cited

U.S. PATENT DOCUMENTS

| | | | | |
|---|---|---|---|---|
| 11,922,703 | B1 * | 3/2024 | Saggu | G06V 20/58 |
| 12,227,209 | B1 | 2/2025 | Feit et al. | |
| 2017/0168494 | A1 | 6/2017 | Sibenac et al. | |
| 2019/0086925 | A1 | 3/2019 | Fan et al. | |
| 2019/0147253 | A1 | 5/2019 | Bai et al. | |
| 2019/0383948 | A1 | 12/2019 | Hoeferlin et al. | |
| 2020/0019175 | A1 | 1/2020 | Dean et al. | |
| 2020/0033869 | A1 | 1/2020 | Palanisamy et al. | |
| 2021/0200212 | A1 * | 7/2021 | Urtasun | G05D 1/0214 |
| 2021/0300415 | A1 | 9/2021 | Yasui | |
| 2022/0044359 | A1 | 2/2022 | Harrison | |
| 2024/0029406 | A1 | 1/2024 | Zhao et al. | |
| 2024/0085938 | A1 | 3/2024 | Abdelhameed | |
| 2024/0295631 | A1 | 9/2024 | Turbiner et al. | |

* cited by examiner

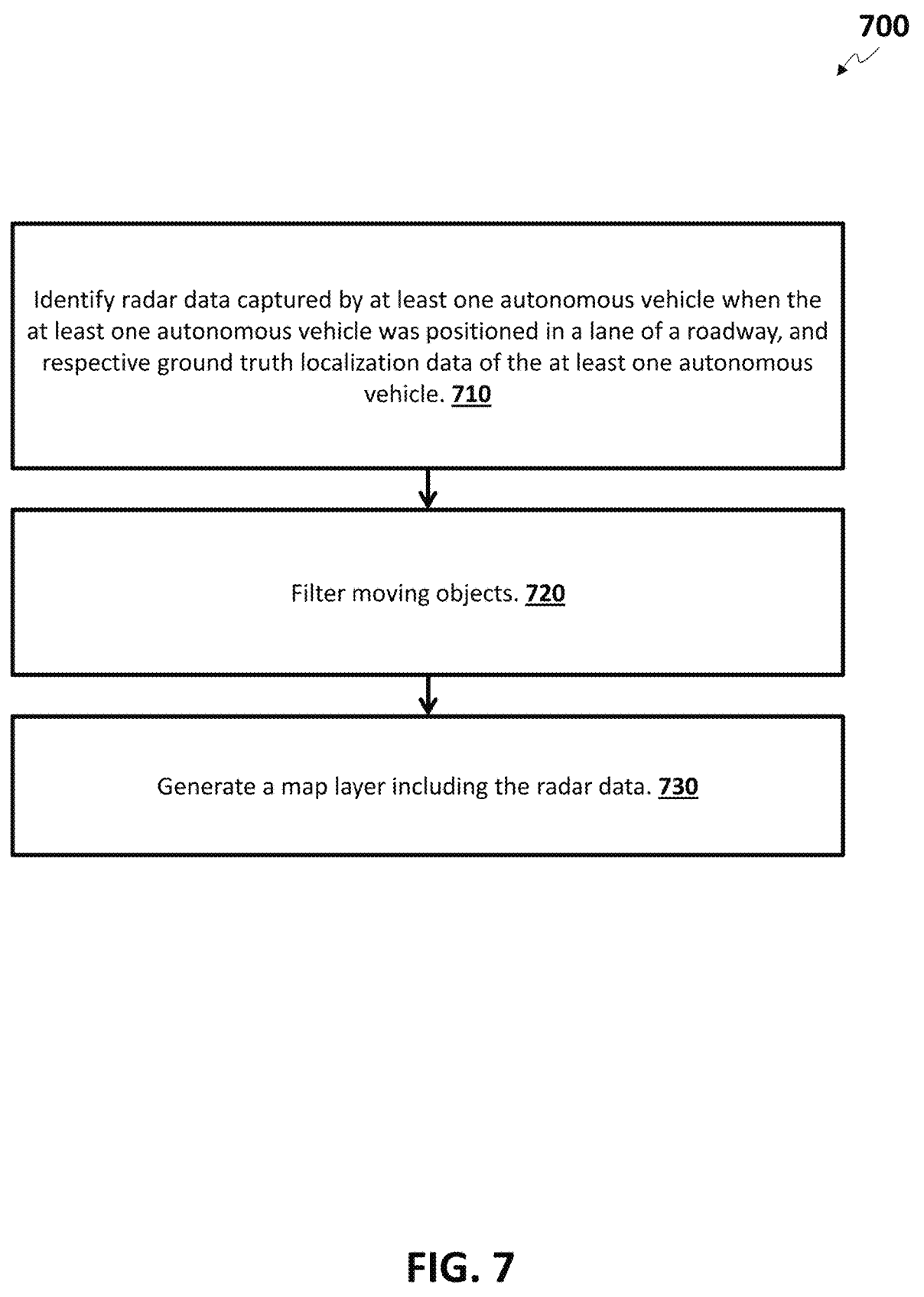

700

Identify radar data captured by at least one autonomous vehicle when the at least one autonomous vehicle was positioned in a lane of a roadway, and respective ground truth localization data of the at least one autonomous vehicle. 710

Filter moving objects. 720

Generate a map layer including the radar data. 730

FIG. 7

USING RADAR DATA FOR AUTOMATIC GENERATION OF MACHINE LEARNING TRAINING DATA AND LOCALIZATION

TECHNICAL FIELD

The present disclosure relates generally to using machine learning to analyze an image, and more particularly, to using machine learning to analyze an image to localize a vehicle.

BACKGROUND

In autonomous driving applications, the position of an autonomous vehicle is critical to monitor with sufficient accuracy. The position of the autonomous vehicle on a roadway is utilized to determine autonomous navigation and maneuvering. The existing solutions for localization rely on a combination of Global Navigation Satellite System (GNSS), an inertial measurement unit, and a digital map. However, such existing solutions can be either computationally expensive, unavailable (e.g., in a tunnel), or comprise significant errors in location (e.g., in an area with reduced signal reception) or location resolution.

SUMMARY

The systems and methods of the present disclosure may solve the problems set forth above and/or other problems in the art. The scope of the current disclosure, however, is defined by the attached claims, and not by the ability to solve any specific problem. Disclosed herein are techniques to improve lane offset detection during autonomous vehicle operation through the use of machine learning models that generate lane indices, which correspond to the lane of a multi-lane roadway upon which the autonomous vehicle is operating. Rather than relying on potentially inaccurate sources of location data, such as GNSS, the systems and methods described herein provide techniques for training and executing machine learning models that generate lane offset and lane index information based on image data captured in real time or near real time by sensors of the autonomous vehicle.

In an embodiment, a method comprises identifying, by a processor, a set of radar data captured by at least one autonomous vehicle when the at least one autonomous vehicle was positioned in a lane of a roadway, and respective ground truth localization data of the at least one autonomous vehicle; filtering, by the processor, one or more objects identified via the set of radar data in accordance with an attribute of the one or more objects; generating, by the processor, a map layer to be included within a high definition map; identifying, by the processor, second set of radar data captured by a second autonomous vehicle when the at least one autonomous vehicle was positioned in the lane of the roadway, and respective ground truth localization data of the at least one autonomous vehicle; and localizing, by the processor, the second autonomous vehicle by executing a matching protocol to match an object within the second set of radar data with an object within the map layer.

The attribute of the one or more objects may correspond to a predetermined shape of the one or more objects.

The attribute of the one or more objects may correspond to whether the one or more objects are moving.

The attribute of the one or more objects may be a size threshold.

The method may further comprise labeling, by the processor, the matched object using data included within the map layer.

The method may further comprise training, by the processor, a machine learning model using at least one labeled data point.

The object identified may be a lane line.

In another embodiment, a non-transitory machine-readable storage medium has computer-executable instructions stored thereon that, when executed by one or more processors, cause the one or more processors to perform operations comprising identify a set of radar data captured by at least one autonomous vehicle when the at least one autonomous vehicle was positioned in a lane of a roadway, and respective ground truth localization data of the at least one autonomous vehicle; filter one or more objects identified via the set of radar data in accordance with an attribute of the one or more objects; generate a map layer to be included within a high definition map; identify second set of radar data captured by a second autonomous vehicle when the at least one autonomous vehicle was positioned in the lane of the roadway, and respective ground truth localization data of the at least one autonomous vehicle; and localize the second autonomous vehicle by executing a matching protocol to match an object within the second set of radar data with an object within the map layer.

The attribute of the one or more objects may correspond to a predetermined shape of the one or more objects.

The attribute of the one or more object may correspond to whether the one or more objects are moving.

The attribute of the one or more object may be a size threshold.

The instruction may further cause the one or more processor to label the matched object using data included within the map layer.

The instruction may further cause the one or more processor to train a machine learning model using at least one labeled data point.

The object identified may be a lane line.

In another embodiment, a system comprises a processor configured to identify a set of radar data captured by at least one autonomous vehicle when the at least one autonomous vehicle was positioned in a lane of a roadway, and respective ground truth localization data of the at least one autonomous vehicle; filter one or more objects identified via the set of radar data in accordance with an attribute of the one or more objects; generate a map layer to be included within a high definition map; identify second set of radar data captured by a second autonomous vehicle when the at least one autonomous vehicle was positioned in the lane of the roadway, and respective ground truth localization data of the at least one autonomous vehicle; and localize the second autonomous vehicle by executing a matching protocol to match an object within the second set of radar data with an object within the map layer.

The one or more objects may correspond to a predetermined shape of the one or more objects.

The attribute of the one or more objects may correspond to whether the one or more objects are moving.

The attribute of the one or more objects may be a size threshold.

The processor may be further configured to label the matched object using data included within the map layer.

The processor may be further configured to train a machine learning model using at least one labeled data point.

In another embodiment, a method comprises instructing, by a processor, a time signal from a grand master clock to be transmitted to a second processor associated with a radar sensor of an autonomous vehicle; instructing, by the processor, the second processor associated with the radar sensor of the autonomous vehicle to sync an internal clock with the time signal; and retrieving, by the processor, radar data from the radar sensor.

The method may further comprise generating, by the processor, a map including the radar data.

The radar data may further comprise a corresponding time-stamp.

The method may further comprise syncing, by the processor, the internal clock of the radar sensor of the autonomous vehicle with a second internal clock of a second sensor of the autonomous vehicle.

The radar sensor may be a LiDAR sensor.

The method further comprise retrieving, by the processor, the time signal; and syncing, by the processor, adding the time signal to a digital map corresponding to the radar data.

In another embodiment, a non-transitory machine-readable storage medium having computer-executable instructions stored thereon that, when executed by one or more processors, cause the one or more processors to perform operations comprising instruct a time signal from a grand master clock to be transmitted to a second processor associated with a radar sensor of an autonomous vehicle; instruct the second processor associated with the radar sensor of the autonomous vehicle to sync an internal clock with the time signal; and retrieve radar data from the radar sensor.

The instruction may further cause the one or more processors to generate a map including the radar data.

The radar data may further comprise a corresponding time-stamp.

The instruction may further cause the one or more processors to sync the internal clock of the radar sensor of the autonomous vehicle with a second internal clock of a second sensor of the autonomous vehicle.

The radar sensor may be a LiDAR sensor.

The instruction may further cause the one or more processors to retrieve the time signal; and sync adding the time signal to a digital map corresponding to the radar data.

In another embodiment, a system comprises a processor configured to instruct a time signal from a grand master clock to be transmitted to a second processor associated with a radar sensor of an autonomous vehicle; instruct the second processor associated with the radar sensor of the autonomous vehicle to sync an internal clock with the time signal; and retrieve radar data from the radar sensor.

The server may be further configured to generate a map including the radar data.

The radar data may further comprise a corresponding time-stamp.

The server may be further configured to sync the internal clock of the radar sensor of the autonomous vehicle with a second internal clock of a second sensor of the autonomous vehicle.

The radar sensor may be a LiDAR sensor.

The server may be further configured to retrieve the time signal; and sync adding the time signal to a digital map corresponding to the radar data.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 7 is a flowchart diagram of an example method of generating a map layer using radar data received, according to an embodiment.

DETAILED DESCRIPTION

Figure 1:
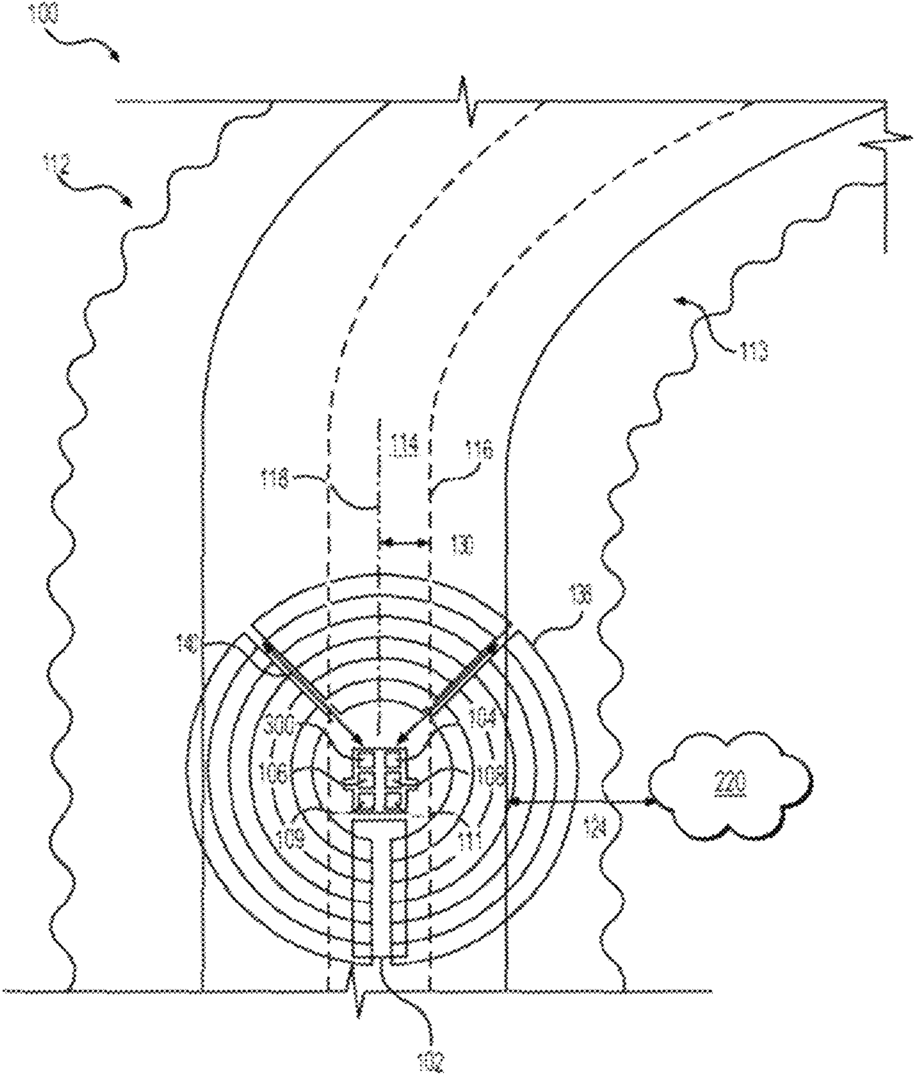
FIG. 1 is a schematic illustration including a bird's eye view of a vehicle traveling along a roadway using a lane offset predictor, according to an embodiment

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of 10% in the stated value.

Autonomous vehicle virtual driver systems are structured on three pillars of technology: 1) perception, 2) maps/localization, and 3) behaviors planning and control. The mission of perception is to sense an environment surrounding an ego vehicle and interpret it. To interpret the surrounding environment, a perception engine may identify and classify objects or groups of objects in the environment. For example, an autonomous system may use a perception engine to identify one or more objects (e.g., pedestrians, vehicles, debris, etc.) in the road before a vehicle and classify the objects in the road as distinct from the road. The mission of maps/localization is to figure out where in the world, or where on a pre-built map, is the ego vehicle. One way to do this is to sense the environment surrounding the ego vehicle (e.g., perception systems) and to correlate features of the sensed environment with details (e.g., digital representations of the features of the sensed environment) on a digital map. Once the systems on the ego vehicle have determined its location with respect to the map features (e.g., intersections, road signs, etc.) the ego vehicle (or just "ego") can plan maneuvers and/or routes with respect to the features of the environment. The mission of behaviors, planning, and control is to make decisions about how the ego should move through the environment to get to its goal or destination. It consumes information from the perception engine and the maps/localization modules to know where it is relative to the surrounding environment and what other traffic actors are doing.

Localization, or the estimate of ego vehicle's position to varying degrees of accuracy, often with respect to one or more landmarks on a map, is critical information that may enable advanced driver-assistance systems or self-driving cars to execute autonomous driving maneuvers. Such maneuvers can often be mission or safety related. For example, localization may be a prerequisite for an ADAS or a self-driving car to provide intelligent and autonomous driving maneuvers to arrive at point C from points B and A. Currently existing solutions for localization may rely on a combination of Global Navigation Satellite System (GNSS), an inertial measurement unit (IMU), and a digital map (e.g., an HD map or other map file including one or more semantic layers).

Localizations can be expressed in various forms based on the medium in which they may be expressed. For example, a vehicle could be globally localized using a global positioning reference frame, such as latitude and longitude. The relative location of the ego vehicle with respect to one or more objects or features in the surrounding environment could then be determined with knowledge of ego vehicle's global location and the knowledge of the one or more objects' or feature's global location(s). Alternatively, an ego vehicle could be localized with respect to one or more features directly. To do so, the ego vehicle may identify and classify one or more objects or features in the environment and may do this using, for example, its own on board sensing systems (e.g., perception systems), such as LiDARs, cameras, radars, etc. and one or more onboard computers storing instructions for such identification and classification.

Environments intended for use by vehicles, whether such vehicles include autonomous features or not, tend to be pattern rich. That is, environments intended for use by automobiles are structured according to a pattern(s) that is recognizable by human drivers and increasingly by autonomous systems (e.g., all stop signs use same shape/color, all stop lights are green/yellow/red, etc.) The patterns enable and, indeed, may require predictable behavior by the operators of the vehicles in the environment, whether human or machine. One such pattern is used in lane indications, which may indicate lane boundaries intended to require particular behavior within the lane (e.g., maintaining a constant path with respect to the lane line, not crossing a solid lane line, etc.) Due to their consistency, predictability, and ubiquity, lane lines may serve as a good basis for a lateral component localization.

FIG. 1 illustrates a system 100 for localizing a vehicle 102. The vehicle 102 depicted in FIG. 1 is a truck (e.g., a tractor trailer), but it is to be understood that the vehicle 102 could be any type of vehicle including a car, a mobile machine, etc. The vehicle 102 includes a controller 300 that is communicatively coupled to a camera system 104, a LiDAR system 106, a GNSS 108, a transceiver 109, and an inertial measurement unit 111 (IMU). The vehicle 102 may operate autonomously or semi-autonomously in any environment. As depicted, the vehicle 102 operates along a roadway 112 that includes a left shoulder, a right shoulder, and multiple lanes including a center lane 114 that is bounded by a right center lane marker 116 (lane indicator or lane indication). The right center lane marker 116 is depicted as a dashed line in convention with the center lane markers in several-lane roadways or highways in the United States, however, the lane marker could take any form (e.g., solid line, etc.) In the particular scenario depicted in FIG. 1, the vehicle 102 is approaching a right turn 113 (or right hand bend in the roadway 112), but any type of roadway or situation is considered herein. For example, the vehicle 102 could be on a road that continues straight, turns left, includes an exit ramp, approaches a stop sign or other traffic signal, etc.

The vehicle 102 has various physical features and/or aspects including a longitudinal centerline 118. As depicted in FIG. 1, the vehicle 102 generally progresses down the roadway 112 in a direction parallel to its longitudinal centerline 118. As the vehicle 102 drives down the roadway 112, it may capture LiDAR point cloud data and visual camera data (when referred to collectively, "image data") using, for example, the LiDAR system 106 and the camera system 104, respectively. In some aspects, the vehicle 102 may also include other sensing systems (e.g., a radar system, etc.) While it travels, the vehicle 102 may constantly, periodically, or on-demand determine its position and/or orientation with the GNSS 108 and/or the IMU 111. The vehicle 102 may be communicatively coupled with a network 220 via a wireless connection 124 using, for example, the transceiver 109.

As the vehicle 102 travels, its systems and/or systems connected to the vehicle 102 may determine a lateral offset 130 from one or more features of the roadway 112. For example, in the particular embodiment depicted in FIG. 1, the vehicle 102 may calculate a lateral offset 130 from the right center lane marker 116. The lateral offset 130 may be, for example, a horizontal distance between the longitudinal centerline 118 of the vehicle 102 and the right center lane marker 116. However, these are merely two examples of features that could be used to calculate a vehicle offset. It is contemplated that any feature of the vehicle 102 (e.g., the right side, the left side, etc.) and any feature of the roadway 112 (e.g., the center lane left side marker, the right lane right side marker, the edge of the right shoulder, etc.) could be used to calculate a lateral offset. In some embodiments, the lateral offset 130 may be used to localize the vehicle 102 as described in greater detail herein.

Figure 3:
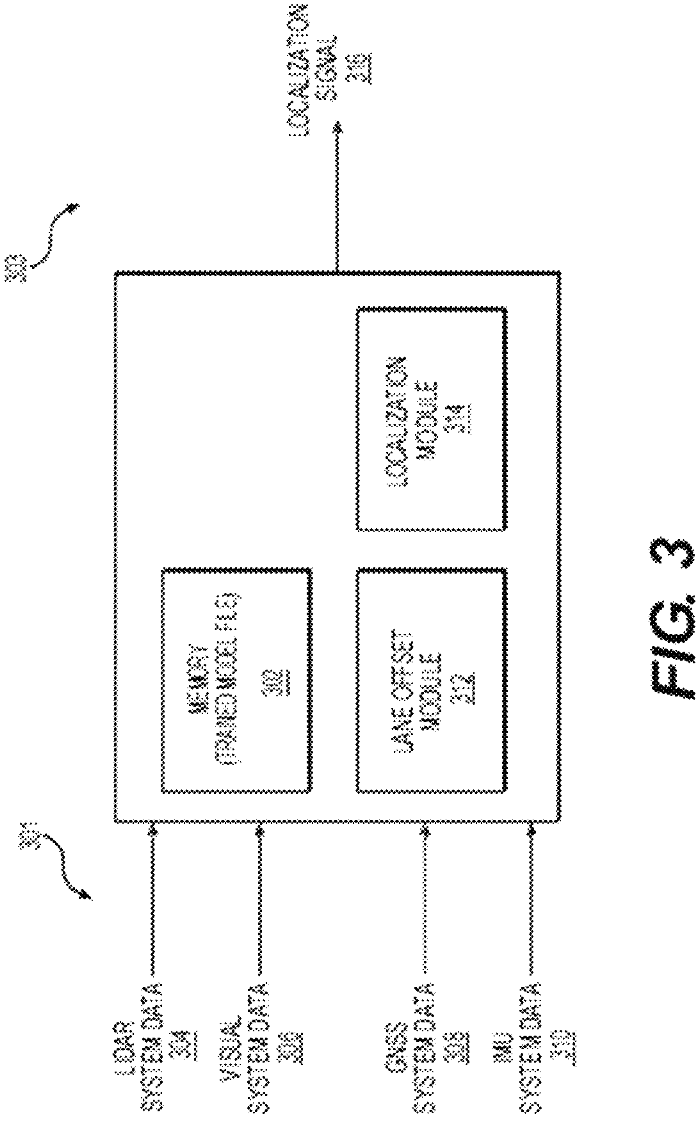
FIG. 3 is a controller for localizing a vehicle using real time data, such as in the scenario depicted in FIG. 1, according to an embodiment.

Still referring to FIG. 1, the controller 300, which is described in greater detail herein, especially with respect to FIG. 3, is configured to receive an input(s) and provide an output(s) to various other systems or components of the system 100. For example, the controller 300 may receive visual system data from the camera system 104, LiDAR system data from the LiDAR system 106, GNSS data from the GNSS 108, external system data from the transceiver 109, and IMU system data from the IMU 111.

The camera system 104 may be configured to capture images of the environment surrounding the vehicle 102 in a field of view (FOV) 138. Although depicted generally surrounding the vehicle 102, the FOV 138 can have any angle or aspect such that images of the areas ahead of, to the side, and behind the vehicle 102 may be captured. In some embodiments, the FOV 138 may surround 360 degrees of the vehicle 102. In some embodiments, the vehicle 102 includes multiple cameras and the images from each of the multiple cameras may be stitched to generate a visual representation of the FOV 138, which may be used to generate a birdseye view of the environment surrounding the vehicle 102, such as that depicted in FIG. 1. In some embodiments, the image file(s) generated by the camera system(s) 104 and sent to the controller 300 and other aspects of the system 100 may include the vehicle 102 or a generated representation of the vehicle 102. In some embodiments, the visual image generated from image data from the camera(s) 104 may appear generally as that depicted in FIG. 1 and show features depicted in FIG. 1 (e.g., lane markers, the roadway, etc.) distinguished from other objects as pixels in an image. In some embodiments, one or more systems or components of the system 100 may overlay labels to the features depicted in the image data, such as on a raster layer or other semantic layer of an HD map. The camera system 104 may include one or more cameras with fields of view horizontally from the vehicle 102 for specific view of the lane indications (including, for example, the right center lane marker 116).

The LiDAR system 106 can send and receive a LiDAR signal 140. Although depicted generally forward, left, and right of the vehicle 102, the LiDAR signal 140 can be emitted and received from any direction such that LiDAR point clouds (or "LiDAR images") of the areas ahead of, to the side, and behind the vehicle 102 can be captured. In some embodiments, the vehicle 102 includes multiple LiDAR sensors and the LiDAR point clouds from each of the multiple LiDAR sensors may be stitched to generate a LiDAR-based representation of the area covered by the LiDAR signal 140, which may be used to generate a birdseye view of the environment surrounding the vehicle 102. In some embodiments, the LiDAR point cloud(s) generated by the LiDAR sensors and sent to the controller 300 and other aspects of the system 100 may include the vehicle 102. In some embodiments, a LiDAR point cloud generated by the LiDAR system 106 may appear generally as that depicted in FIG. 1 and show features depicted in FIG. 1 (e.g., lane markers, the roadway, etc.) distinguished from other objects as pixels in a LiDAR point cloud. In some embodiments, the system inputs from the camera system 104 and the LiDAR system 106 may be fused.

The GNSS 108 may be positioned on the vehicle 102 and may be configured to determine a location of the vehicle 102, which it may embody as GNSS data, as described herein, especially with respect to FIG. 3. The GNSS 108 may be configured to receive one or more signals from a global navigation satellite system (GNSS) (e.g., GPS system) to localize the vehicle 102 via geolocation. In some embodiments, the GNSS 108 may provide an input to or be configured to interact with, update, or otherwise utilize one or more digital maps, such as an HD map (e.g., in a raster layer or other semantic map). In some embodiments, the GNSS 108 is configured to receive updates from the external network 220 (e.g., via a GNSS/GPS receiver (not depicted), the transceiver 109, etc.) The updates may include one or more of position data, speed/direction data, traffic data, weather data, or other types of data about the vehicle 102 and its environment.

The transceiver 109 may be configured to communicate with the external network 220 via the wireless connection 124. The wireless connection 124 may be a wireless communication signal (e.g., Wi-Fi, cellular, LTE, 5g, etc.). However, in some embodiments, the transceiver 109 may be configured to communicate with the external network 220 via a wired connection, such as, for example, during testing or initial installation of the system 100 to the vehicle 102. The wireless connection 124 may be used to download and install various lines of code in the form of digital files (e.g., HD maps), executable programs (e.g., navigation programs), and other computer-readable code that may be used by the system 100 to navigate the vehicle 102 or otherwise operate the vehicle 102, either autonomously or semi-autonomously. The digital files, executable programs, and other computer readable code may be stored locally or remotely and may be routinely updated (e.g., automatically or manually) via the transceiver 109 or updated on demand. In some embodiments, the vehicle 102 may deploy with all of the data it needs to complete a mission (e.g., perception, localization, and mission planning) and may not utilize the wireless connection 124 while it is underway.

The IMU 111 may be an electronic device that measures and reports one or more features regarding the motion of the vehicle 102. For example, the IMU 111 may measure a velocity, acceleration, angular rate, and or an orientation of the vehicle 102 or one or more of its individual components using a combination of accelerometers, gyroscopes, and/or magnetometers. The IMU 111 may detect linear acceleration using one or more accelerometers and rotational rate using one or more gyroscopes. In some embodiments, the IMU 111 may be communicatively coupled to the GNSS 108 and may provide an input to and receive an output from the GNSS 108, which may allow the GNSS 108 to continue to predict a location of the vehicle 102 even when the GNSS cannot receive satellite signals.

Figure 2:
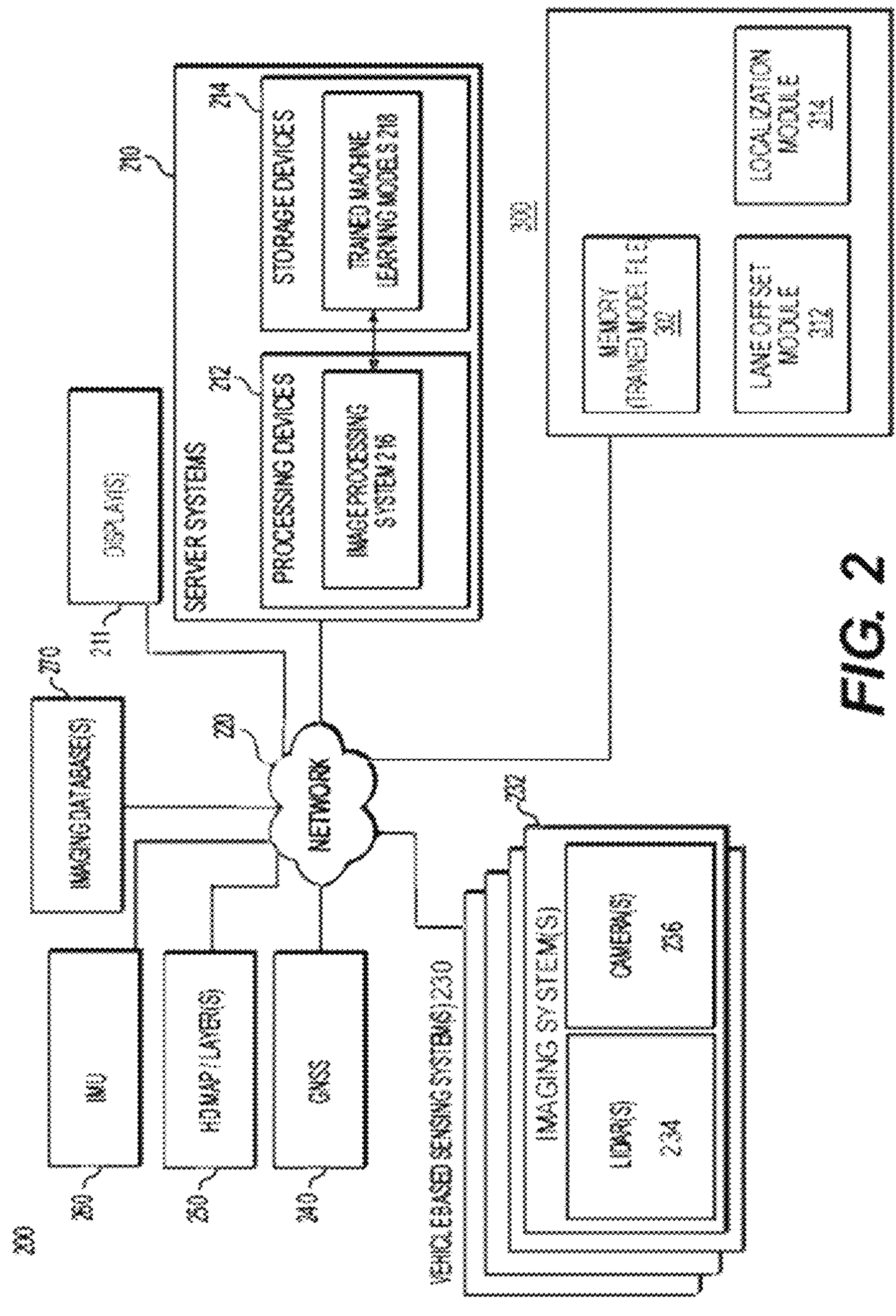
FIG. 2 is an exemplary environment for creating one or more trained machine learning algorithms for predicting a lane offset, such as the lane offset of FIG. 1, according to an embodiment.

Referring now to FIG. 2, an exemplary environment 200 for generating and training machine learning models to predict a lane offset according to an exemplary process of the present disclosure is shown. FIG. 2 includes the environment 200 which may include the network 220 that communicatively couples one or more server systems 210, one or more vehicle based sensing systems 230 which may include one or more imaging systems 232 (e.g., LiDAR systems and/or camera systems), one or more GNSS systems 240, one or more HD map systems 250, one or more IMU systems 260, and one or more imaging databases 270. Additionally, the controller 300 of FIGS. 1 and 3 may be communicatively coupled to the network 220 and may upload and download data from one or more of the other systems connected to the network 220 as described herein. In some embodiments, the exemplary environment may include one or more displays, such as the display 211, for displaying information.

The server systems 210 may include one or more processing devices 212 and one or more storage devices 214. The processing devices 212 may be configured to implement an image processing system 216. The image processing system 216 may apply AI, machine learning, and/or image processing techniques to image data received, e.g., from vehicle based sensing systems 230, which may include LiDAR(s) 234, camera(s) 236. Other vehicle based sensing systems are contemplated such as, for example, radar, ultrasonic sensing, etc. The vehicle based sensing systems 230 may be deployed on, for example, a fleet of vehicles such as the vehicle 102 of FIG. 1.

Still referring to FIG. 2, the image processing system 216 may include a training image platform configured to generate and train a plurality of trained machine learning models 218 based on datasets of training images received, e.g., from one or more imaging databases 270 over the network 120 and/or from the vehicle based sensing systems 230 on the fleet of vehicles. In some embodiments, data generated using the vehicle based sensing systems 230 may be used to populate the imaging databases 270. The training images may be, for example, images of vehicles operating on a roadway including one or more lane boundaries or lane features (e.g., a lane boundary line, a right roadway shoulder edge, etc.) The training images may be real images or synthetically generated images (e.g., to compensate for data sparsity, if needed). The training images received may be annotated e.g., using one or more of the known or future data annotation techniques, such as polygons, brushes/erasers, bounding boxes, keypoints, keypoint skeletons, lines, ellipses, cuboids, classification tags, attributes, instance/object tracking identifiers, free text, and/or directional vectors, in order to train any one or more of the known or future model types, such as image classifiers, video classifiers, image segmentation, object detection, object direction, instance segmentation, semantic segmentation, volumetric segmentation, composite objects, keypoint detection, keypoint mapping, 2-Dimension/3-Dimension and 6 degrees-of-freedom object poses, pose estimation, regressor networks, ellipsoid regression, 3D cuboid estimation, optical character recognition, text detection, and/or artifact detection.

The trained machine learning models 218 may include convolutional neural networks (CNNs), support vector machines (SVMs), generative adversarial networks (GANs), and/or other similar types of models that are trained using supervised, unsupervised, and/or reinforcement learning techniques. For example, as used herein, a "machine learning model" generally encompasses instructions, data, and/or a model configured to receive input, and apply one or more of a weight, bias, classification, or analysis on the input to generate an output. The output may include, e.g., a classification of the input, an analysis based on the input, a design, process, prediction, or recommendation associated with the input, or any other suitable type of output. A machine learning system or model may be trained using training data, e.g., experiential data and/or samples of input data, which are fed into the system in order to establish, tune, or modify one or more aspects of the system, e.g., the weights, biases, criteria for forming classifications or clusters, or the like. The training data may be generated, received, and/or otherwise obtained from internal or external resources. Aspects of a machine learning system may operate on an input linearly, in parallel, via a network (e.g., a neural network), or via any suitable configuration. The trained machine learning models 218 may include the left lane index model 610, the right lane index model 620, and the one or more road analysis model(s) 630 described in connection with FIG. 6.

The execution of the machine learning system may include deployment of one or more machine learning techniques, such as linear regression, logistical regression, random forest, gradient boosted machine (GBM), deep learning, and/or a deep neural network (e.g., multi-layer perceptron (MLP), CNN, recurrent neural network). Supervised and/or unsupervised training may be employed. For example, supervised learning may include providing training data and labels corresponding to the training data, e.g., as ground truth. Training data may comprise images annotated by human technicians (e.g., engineers, drivers, etc.) and/or other autonomous vehicle professionals. Unsupervised approaches may include clustering, classification, or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. Alternatively, reinforcement learning may be employed for training. For example, reinforcement learning may include training an agent interacting with an environment to make a decision based on the current state of the environment, receive feedback (e.g., a positive or negative reward based on accuracy of decision), adjusts its decision to maximize the reward, and repeat again until a loss function is optimized.

The trained machine learning models 218 may be stored by the storage device 214 to allow subsequent retrieval and use by the system 210, e.g., when an image is received for processing by the vehicle 102 of FIG. 1. In other techniques, a third party system may generate and train the plurality of trained machine learning models 218. The server systems 210 may send and/or receive trained machine learning models 218 from the third party system and store within the storage devices 214. In some examples, the images generated by the imaging systems 232 may be transmitted over the network 220 to the imaging databases 270 or to the server systems 210 for use as training image data. In some embodiments, the trained machine learning models 218 may be trained to generate a trained model file which may be sent, for example, to a memory 302 of the controller 300 and used by the vehicle 102 to localize the vehicle 102 as described in greater detail herein. In some implementations, the left lane index model 610, the right lane index model 620, and the one or more road analysis model(s) 630 described in connection with FIG. 6 may be transmitted to the controller 300, which may implement the lane analysis module 600.

The network 220 over which the one or more components of the environment 200 communicate may be a remote electronic network and may include one or more wired and/or wireless networks, such as a wide area network ("WAN"), a local area network ("LAN"), personal area network ("PAN"), a cellular network (e.g., a 3G network, a 4G network, a 5G network, etc.) or the like. In one technique, the network 120 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The server systems 210, imaging systems 230, GNSS 240, HD Map 250, and IMU 260, and/or imaging databases 270 may be connected via the network 120, using one or more standard communication protocols. In some embodiments, the vehicle 102 (FIG. 1) may be communicatively coupled (e.g., via the controller 300) with the network 220.

The GNSS 240 may be communicatively coupled to the network 220 and may provide highly accurate location data to the server systems 210 for one or more of the vehicles in a fleet of vehicles. The GNSS signal received from the GNSS 240 of each of the vehicles may be used to localize the individual vehicle on which the GNSS receiver is positioned. The GNSS 240 may generate location data which may be associated with a positon from which particular image data is captured (e.g., a location at which an image is captured) and, in some embodiments, may be considered a ground truth position for the image data. In some embodiments, image data captured by the one or more vehicles in the fleet of vehicles may be associated with (e.g., stamped) with data from the GNSS 240 which may relate the image data to an orientation, a velocity, a position, or other aspect of the vehicle capturing the image data. In some embodiments, the GNSS 240 may be used to associate location data with image data such that a subset of the trained model file can be generated based on the capture location of a particular set of image data to generate a location-specific trained model file.

In some embodiments, the HD map 250, including one or more layers, may provide an input to or receive an input from one or more of the systems or components connected to the network 220. For example, the HD map 250 may provide raster map data as an input to the server systems 210 which may include data categorizing or otherwise identifying portions, features, or aspects of a vehicle lane (e.g., the lane markings of FIG. 1) or other features of the environment surrounding a vehicle (e.g., stop signs, intersections, street names, etc.)

The IMU 260 may be an electronic device that measures and reports one or more of a specific force, angular rate, and/or the orientation of a vehicle (e.g., the vehicle 102 of FIG. 1) using a combination of accelerometers, gyroscopes, and/or magnetometers. The IMU 260 may be communicatively coupled to the network 220 and may provide dead reckoning position data or other position, orientation, or movement data associated with one or more vehicles in the fleet of vehicles. In some embodiments, image data captured by the one or more vehicles in the fleet of vehicles may be associated with (e.g., stamped) with data from the IMU 260 which may relate the image data to a position, orientation, or velocity of the vehicle capturing the data. In some embodiments, data from the IMU 260 may be used in parallel with or in place of GNSS data from the GNSS 240 (e.g., when a vehicle captures image data from inside a tunnel where no GNSS signal is capable).

Referring now to FIG. 3, the controller 300 is depicted in greater detail. The controller 300 may receive inputs 301 and generate outputs 303. The controller 300 may include a memory 302, a lane offset module 312, and a localization module 314. The inputs 301 may include LiDAR system data 304, visual system data 306, GNSS system data 308, and IMU system data 310. The outputs 303 may include a localization signal 316. The memory 302 may include a trained model file, which may have been trained, for example, by the machine learning models 218 of FIG. 2.

The controller 300 may comprise a data processor, a microcontroller, a microprocessor, a digital signal processor, a logic circuit, a programmable logic array, or one or more other devices for controlling the system 100 in response to one or more of the inputs 301. Controller 300 may embody a single microprocessor or multiple microprocessors that may include means for automatically generating a localization of the vehicle 102. For example, the controller 300 may include a memory, a secondary storage device, and a processor, such as a central processing unit or any other means for accomplishing a task consistent with the present disclosure. The memory or secondary storage device associated with controller 300 may store data and/or software routines that may assist the controller 300 in performing its functions, such as the functions of the exemplary process 400 described herein with respect to FIG. 4.

Further, the memory or secondary storage device associated with the controller 300 may also store data received from various inputs associated with the system 100. Numerous commercially available microprocessors can be configured to perform the functions of the controller 300. It should be appreciated that controller 300 could readily embody a general machine controller capable of controlling numerous other machine functions. Alternatively, a special-purpose machine controller could be provided. Further, the controller 300, or portions thereof, may be located remote from the system 100. Various other known circuits may be associated with the controller 300, including signal-conditioning circuitry, communication circuitry, hydraulic or other actuation circuitry, and other appropriate circuitry.

The memory 302 may store software-based components to perform various processes and techniques described herein of the controller 300, including the lane offset module 312, and the localization module 314. The memory 302 may store one or more machine readable and executable software instructions, software code, or executable computer programs, which may be executed by a processor of the controller 300. The software instructions may be further embodied in one or more routines, subroutines, or modules and may utilize various auxiliary libraries and input/output functions to communicate with other equipment, modules, or aspects of the system 100. In some implementations, the localization module 314 may implement any of the functionality of the localization module 640 described in connection with FIG. 6, or vice versa.

As mentioned above, the memory 302 may store a trained model file(s) which may serve as an input to one or more of the lane offset module 312 and/or the localization module 314. The trained model file(s) may be stored locally on the vehicle such that the vehicle need not receive updates when on a mission. The trained model files may be machine-trained files that include associations between historical image data and historical lane offset data associated with the historical image data. The trained model file may contain trained lane offset data that may have been trained by one or more machine-learning models having been configured to learn associations between the historical image data and the historical lane offset data as will be described in greater detail herein. In some embodiments, the trained model file may be specific to a particular region or jurisdiction and may be trained specifically on that region or jurisdiction. For example, in jurisdictions in which a lane indication has particular features (e.g., a given length, width, color, etc.) the trained model file may be trained on training data including only those features. The features and aspects used to determine which training images to train a model file may be based on, for example, location data as determined by the GNSS system 108, for example.

The lane offset module 312 may generate a lane offset of the vehicle 102 within a given lane. The lane offset may be an indication of the vehicle's lateral position within the lane and may be used (e.g., combined with a longitudinal position) to generate a localization of the vehicle 102 (e.g., a lateral and longitudinal positon with respect to the roadway 112). In an embodiment, the lane offset module 312 or the controller 300 may execute the lane analysis module 600 to generate one or more lane indices based on data captured during operation of the autonomous vehicle. For example, the left lane index model 610 and the right lane index model 620 may be executed to generate the left and right lane indices, respectively, of the lane in which the autonomous vehicle is traveling, as described herein.

The lane offset module 312 may be configured to generate and/or receive, for example, one or more trained model files in order to generate a lane offset that may then be used, along with other data (e.g., LiDAR system data 304, visual system data 306, GNSS system data 308, IMU system data 310, and/or the trained model file) by the localization module 314 to localize the vehicle 102 as described in greater detail herein.

The disclosed aspects of the system 100 of the present disclosure may be used to localize an ego vehicle, such as the vehicle 102 of FIG. 1. More specifically, the ego vehicle may be localized based on a conversion of obtained image data into image feature data, which may then be computed, using one or more trained machine learning models, as lane offset data which may correspond to the image data. Additionally, the left lane index model 610, the right lane index model 620, and the one or more road analysis models 630 of FIG. 6 can be executed to determine lane index information or other lane characteristics using the obtained image data, as described herein.

Figures 4, 5:
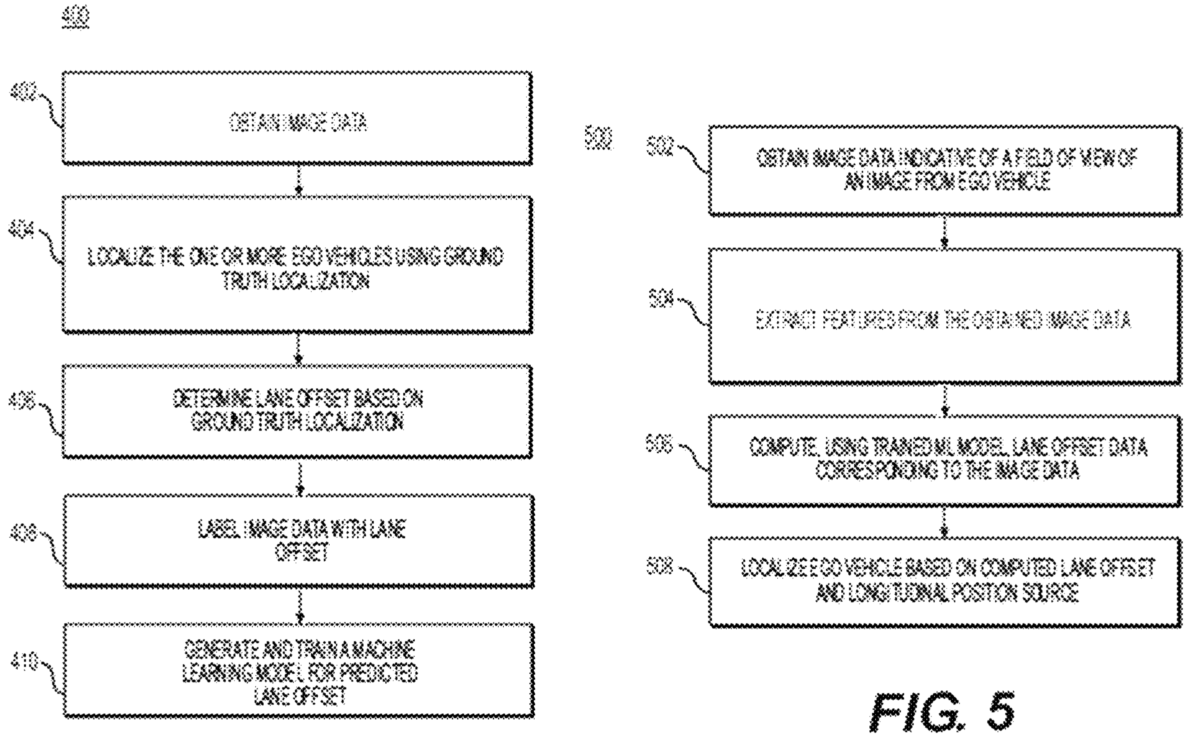
FIG. 4 is a process for training a machine learning model to predict a lane offset from real time image data, such as image data captured in the scenario depicted in FIG. 1, according to an embodiment.
FIG. 5 is a process for using a machine learning algorithm to predict a lane offset using real time image data, such as image data captured in the scenario depicted in FIG. 1, according to an embodiment.

FIG. 4 depicts an exemplary process 400 performed in an environment, such as the environment 200 of FIG. 2. At step 402, the process begins when image data is obtained. The image data may be obtained, for example, from a database of imagery and/or by a fleet of vehicles operating in a physical environment such as the physical environment depicted in FIG. 1 (e.g., a highway) and may include image data generally depicting the features, aspects, or objects in the environment of the roadway (e.g., image data capturing the lane lines and other features in the environment). The image data may be obtained by a fleet of trucks or other systems equipped with imaging and other sensing systems (e.g., cameras, LiDARs, radars, etc.) The vehicles in the fleet of vehicles may be configured such that they are periodically capturing image data (e.g., on a duty cycle) and the period could be set to any value (e.g., 20% of the time, 50% of the time, 100% of the time). In some embodiments, the period could be based on a number of miles driven (e.g., capture image data every $100^{th}$ mile for ten miles, etc.) or be location based (e.g., capture data for a geographic location in which data has not been captured to the desired level). The image data may be collected over any number of miles driven (e.g., in the millions of miles driven) and may be stored, for example, in the imaging database(s) 270 of FIG. 2. In some embodiments, one or more filters may be applied to the image data in order to prepare the image data for processing.

The obtained images may be classified based on one or more factors, such as, for example, traffic density at time of capture (e.g., normal, crowded, etc.), and may be associated with a particular geographic location (e.g., southwest United States, greater Phoenix, U.S. Interstate 40, etc.) In some embodiments, an operator or other person may input labels to the image data (e.g., the labels discussed above) in order to label the image data for a training set of data. Additionally, in some embodiments, the vehicle 102 or associated system may perform feature extraction on the obtained images, for example, using a convolutional neural network to determine the presence of a lane line in the image data. CNN's may provide strong feature extraction capabilities and in embodiments, the CNN may utilize one or more convolution processes or steps, such as, for example, a parallel spatial separation convolution to reduce network complexity and may use height-wise and/or width-wise convolution to extract underlying features of the image data. The CNN may also use height-wise and width-wise convolutions to enrich detailed features and in some embodiments, may use one or more channel-weighted feature merging strategies to merge features. The feature extraction techniques may assist with classification efficiency. In some embodiments, the training data may be augmented using, for example, random rescaling, horizontal flips, perturbations to brightness, contrast, and color, as well as random cropping.

At step 404, the one or more vehicles in the fleet of vehicles may localize using a ground truth location source (e.g., highly accurate GNSS). The ground truth localization may include a relative and/or absolute position (e.g., GPS coordinates, latitude/longitude coordinates, etc.) and may be obtained separately or contemporaneously with the image data. In some embodiments, portions of the ground truth localization data may represent the ground truth location of the vehicle capturing the image data at the time the image was captured. For example, with reference to FIG. 1, the vehicle 102 may capture image data using, for example, one or more of the camera system 104 and the LiDAR system 106. The vehicle 102 may obtain an image including one or more features in the surrounding environment, for example, a right center lane marker 116. Simultaneously, the vehicle 102 may capture highly accurate GNSS data using the GNSS 108. The image data may be labeled with the highly accurate location data. In some embodiments, the system 100 may apply a confidence to one or more of the ground truth information sources and the ground truth information sources may be selected based on the applied confidence.

At step 406, the vehicle 102 (or other component of the environment 200 of FIG. 2) may determine a lane offset of the ego vehicle based on the image data and the ground truth localization. With brief reference to FIG. 1, the lane offset 130 may be a unidimensional distance from a feature of the vehicle (e.g., the longitudinal centerline 118) to a visible and distinguishable feature of the image data (e.g., the right center lane marker 116). The lane offset may be measured in any distance unit (e.g., feet, meters, etc.) and may be expressed as an absolute value (e.g., "two feet from the right center lane marker 116") or as a difference from centerline or some other reference point associated with the lane (e.g., "+/−0.2 meters from the centerline 118").

To determine the lane offset of the ego vehicle, the system may use one or more localization solution sources. For example, the system may use a mature map localization solution run in real time, online on the vehicle 102. Additionally, the system may use post process kinematics (PPK) correction from a GPS signal (e.g., as received through the GNSS 108). Additionally, the system may use a real time kinematic correction from a GPS signal (e.g., as received through the GNSS 108).

At step 408, the vehicle 102 or other component of the environment 200 may label the image data generated by the imaging systems of the vehicle 102 with the lane offset values determined based on the ground truth localization. The ground truth localization may be based on, for example, mature and verified map-localization solutions. Labeling the image data with the ground truth lane offset may generate ground truth lane offset image data, which may be used as ground truth data to, for example, train one or more machine learning models to predict a lane offset based on real time image data captured by an ego vehicle.

At step 410, a machine learning model for predicting a lane offset may be generated and trained. For example, lane offset image data may be input to the machine learning model. The machine learning model may be of any of the example types listed previously herein. With brief reference to FIG. 1, the machine learning model may predict, for example, a lane offset 130 from the longitudinal centerline 118 of the vehicle 102 to the right center lane marker 116 of the center lane 114. In some embodiments, the predicted lane offset may be based on the labeled image data generated to include the ground truth location data. In embodiments in which the lane offset is predicted, the lane offset may be predicted in addition to or in lieu of a ground truth location as determined by another system of the vehicle 102 (e.g., the GNSS 108, the IMU 111, etc.)

To train the machine learning model, the predicted lane offset output by the machine learning model for given image data may be compared to the label corresponding to the ground truth location to determine a loss or error. For example, a predicted lane offset for a first training image may be compared to a known location within the first training image identified by the corresponding label. The machine learning model may be modified or altered (e.g., weights and/or bias may be adjusted) based on the error to improve the accuracy of the machine learning model. This process may be repeated for each training image or at least until a determined loss or error is below a predefined threshold. In some examples, at least a portion of the training images and corresponding labels (e.g., ground truth location) may be withheld and used to further validate or test the trained machine learning model.

Once the machine learning model is sufficiently trained it may be stored for subsequent use (e.g., as one of trained machine learning models 218 stored in storage devices 214). In some examples, the trained machine learning model may be a single machine learning model that is generated and trained to predict lane offset(s). In other examples, the exemplary process 400 may be performed to generate and train an ensemble of machine learning models, where each model predicts a lane offset. When deployed to evaluate image data generated by an ego vehicle, the ensemble of machine learning models may be run separately or in parallel.

FIG. 5 illustrates an exemplary process 500 for localizing an ego vehicle according to exemplary techniques described herein. Exemplary process 500 may be performed, for example, by the vehicle 102. The exemplary process 500 may include one or more of the following steps.

At step 502, image data which is indicative of a field of view is obtained. For example, with reference to FIG. 1, the vehicle 102 may obtain image data from the environment surrounding the vehicle 102. The image data may be received in any perspective (e.g., 360 degree field of view) based on the orientation, position, and field of view of the individual sensing devices on the vehicle 102. Additionally, the image data may include LiDAR system data and visual system data. In some embodiments, the LiDAR system data and the visual system data may be stitched and/or fused together to form a LiDAR/visual system picture. In some embodiments, the obtained image data may include only one of either LiDAR or visual system data. The LiDAR/visual system picture may indicate the various features in the environment as depicted in FIG. 1. That is, the LiDAR/visual image systems may provide data and generate images with sufficient resolution to detect and classify each of the physical features and/or aspects depicted in FIG. 1. In some embodiments, a user (e.g., an onboard passenger, a remote operator, etc.) may select one or more LiDAR systems or camera systems with which the vehicle 102 may capture image. For example, on vehicles including one or more LiDAR systems and/or camera systems, the user may select which system to use (e.g., use the right-side facing camera to capture image data).

At step 504, one or more features may be extracted from the obtained image data. The image data may be, for example, preprocessed using computer vision to process, load, transform, and manipulate images for building an ideal dataset for a machine learning algorithm. The image data may be converted into one or more similar formats. Various unnecessary regions, features, or other data may be cropped from the image data. In some embodiments, obtained image data from various sensors may be centered based on one or more feature pixels, e.g., by subtracting the per-channel mean pixel values calculated on the training dataset.

At step 506, the system 100 may compute, using a trained machine learning model, lane offset data corresponding to the image data. The lane offset data may represent a unidimensional length from a centerline of the longitudinal axis of the vehicle 102 to the edge of some feature of the roadway 112. For example, the lane offset data may represent a unidimensional distance from the longitudinal axis of the vehicle 102 to the right center lane marker 116 as shown in FIG. 1, but the lane offset could be from any portion of the vehicle 102 (e.g., axis along the right or left side of the vehicle 102) to any feature of the roadway 112 (e.g., the right shoulder). The lane offset module 312 may use, for example, the trained model file, which may be stored in the memory 302, to calculate the lane offset.

Specifically, the lane offset module 312 may use machine learning to compute the lane offset. More specifically, the lane offset generated at step 508, may be a prediction of a lane offset based on a machine learning process applied to the image data captured by one or more of the LiDAR system 106 and the camera system 104. The prediction may be made a high level of accuracy based on the “corpus” of image data used to generate the trained model files (which training is described herein), which may have been collected by, at least in part, the vehicle 102.

At step 508, the system 100 may localize the vehicle 102 by correlating the lane offset of the vehicle 102 generated at step 506 with longitudinal position data using, for example, the localization module 314. The longitudinal position data may be generated based on one or more of, for example, the GNSS system data 308 and the IMU system data 310. Thus, the vehicle 102 may have a highly accurate lateral position based on the lane offset and an accurate, longitudinal position based on the GNSS and the IMU. Thus the vehicle 102 may have both a lateral and longitudinal position within the lane.

For example, the lane offset module 312 may generate a unidimensional position indication of the vehicle 102 within the lane based on a distance from an aspect of the vehicle 102 (e.g., the centerline 118) and a lane indication (e.g., the center lane right side marker 116). For example, the unidimensional position indication may indicate 1.7 meters from the vehicle centerline 118 to the center lane right side marker 116. The localization could be presented in any usable format, such as, for example, “15 cm right of center,” “+/−15 cm,” etc. The longitudinal position may come from the GNSS system 108 and/or the IMU 111. Having both a highly accurate lateral position and a longitudinal position, the vehicle 102 is localized within the lane and its position may be plotted on an HD map or other semantic map, using, for example, the localization signal 316 to localize the vehicle 102.

Figure 6:
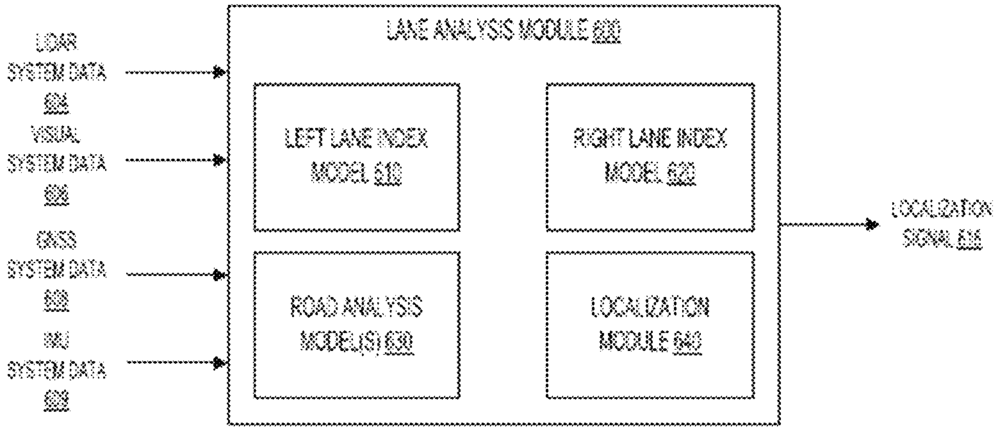
FIG. 6 is a block diagram of an example lane analysis module that may be utilized to generate lane indices using machine learning models, according to an embodiment.

FIG. 6 is a block diagram of an example lane analysis module 600 that may be utilized to generate lane indices using machine learning models (e.g., the left lane index model 610, the right lane index model 620, the one or more road analysis models 630, etc.), according to an embodiment. The lane analysis module 600 includes a left lane index model 610, a right lane index model 620, one or more road analysis models 630, and a localization module 640. Inputs to the lane analysis module 600 may include LiDAR system data 604, visual system data 606, GNSS system data 608, and IMU system data 609. Outputs of the lane analysis module 600 may include a localization signal 616.

Each of the LiDAR system data 604, the visual system data 606, the GNSS system data 608, and the IMU system data 609 may be similar to the LiDAR system data 304, the visual system data 306, the GNSS system data 308, and the IMU system data 310 described in connection with FIG. 3. The inputs to the lane analysis module 600 may be captured, for example, using one or more of the sensors of the system 100 described herein (e.g., the imaging system 232, the IMU 260, the GNSS 240, etc.). The lane analysis module 600 may be executed by one or more processors of an autonomous vehicle, such as the controller 300 of the vehicle 102, as described herein. The lane analysis module 600 may be a part of, or may implement any of the structure or functionality of, the lane offset module 312 and/or the localization module 314. For example, the lane analysis module 600 may be executed to calculate lane index values, as described herein, in addition lane offset values. The outputs of the lane analysis module 600 may be provided, for example, to localize the autonomous vehicle corresponding to the lane analysis module 600.

Each of the left lane index model 610 and the right lane index model 620 may be neural network models that include a number of machine learning layers. In an embodiment, the left lane index model 610 and the right lane index model 620 may have a similar or identical architecture (e.g., number and type of layers), but may be trained to generate different values (e.g., using different ground truth data). Each of the left lane index model 610 and the right lane index model 620 may include one or more feature extraction layers, which may include convolutional layers or other types of neural network layers (e.g., pooling layers, activation layers, normalization layers, etc.). Each the left lane index model 610 and the right lane index model 620 can include one or more classification layers (e.g., fully connected layers, etc.) that can output a classification of the relative lane index.

Each of the left lane index model 610 and the right lane index model 620 can be trained to receive image data as input and generate a corresponding lane index value as output. The image data can include any type of image data described herein, including the LiDAR system data 604 (e.g., LiDAR images or point clouds, etc.) and the visual system data 606 (e.g., images or video frames captured by cameras of the autonomous vehicle). The lane index value can be an index referencing the lane that the respective machine learning model (e.g., the left lane index model 610 or the right lane index model 620) determines that the autonomous vehicle was positioned in when the input image data was captured.

The lane index can be relative to the leftmost or rightmost lanes. The left lane index model 610 can be trained to generate a left lane index value that is relative to the leftmost lane, and the right lane index model 620 can be trained to generate a right lane index value that is relative to the rightmost lane. In a non-limiting example, the rightmost lane of a four lane highway may have a right lane index value of one, and a left lane index value of four. The leftmost lane of the four lane high can have a right lane index value of four, and a left lane index value of one. The middle-right lane of the four lane highway can have a right lane index value of two, and a left lane index value of three. The middle-left lane of the four-lane highway can have a right lane index value of three, and a left lane index value of two.

Each of the left lane index model 610 and the right lane index model 620 may be trained as part of the machine learning models 218 described herein. The left lane index model 610 and the right lane index model 620 can be trained by one or more computing systems or servers, such as the server systems 210, as described herein. For example, the left lane index model 610 and the right lane index model 620 may be trained using supervised and/or unsupervised training techniques. For example, using a supervised learning approach, the left lane index model 610 and the right lane index model 620 may be trained using providing training data and labels corresponding to the training data (e.g., as ground truth). The training data may include a respective label for each of left lane index model 610 and the right lane index model 620 for a given input image. During training, both the left lane index model 610 and the right lane index model 620 may be provided with the same input data, but may be trained using different and respective labels.

During training, input image data can be propagated through each layer of the left lane index model 610 and the right lane index model 620 until respective output values are generated. The output values can be utilized with the respective left and right ground truth labels associated with the input image data to calculate loss values for the left lane index model 610 and the right lane index model 620. Some non-limiting example loss functions used to calculate the loss values include mean squared error, cross-entropy, and hinge loss. The trainable parameters of the left lane index model 610 and the right lane index model 620 can then be modified according to their respective loss values using a backpropagation technique (e.g., gradient descent or another type of optimizer, etc.) to minimize the loss values. The left lane index model 610 and the right lane index model 620 can be iteratively trained until a training termination condition (e.g., a maximum number of iterations, a performance threshold determined using a validation dataset, a rate of change in model parameters falling below a threshold, etc.) has been reached.

Once trained, the left lane index model 610 and the right lane index model 620 can be provided to the lane analysis module 600 of one or more autonomous vehicles (e.g., the vehicle 102) via a network (e.g., the network 220) or another communications interface. Each of the left lane index model 610 and the right lane index model 620 can then be executed using data sensor data (e.g., the LiDAR system data 604, the visual system data 606, etc.) captured by the sensors of the autonomous vehicle as the autonomous vehicle operates on a roadway. The lane analysis module 600 can execute each of the left lane index model 610 and the right lane index model 620 by propagating the input data through the left lane index model 610 and the right lane index model 620 to generate a left lane index value and a right lane index value. The left lane index value can represent the index of the lane in which the autonomous vehicle is traveling relative to the leftmost lane, and the right lane index value can represent the index of the lane in which the autonomous vehicle is traveling relative to the rightmost lane.

In some implementations, the lane analysis module 600 can perform error checking on the left lane index value and the right lane index value. For example, if the left lane index value determines (e.g., based on a determined number of lanes in the roadway from a predefined map or from an output of the road analysis models 630) that the left lane index value does not agree with the right lane index value, the lane analysis module 600 may generate an error message in a log or other error file.

Each of the generated left lane index value and the right lane index value can be provided to the localization module 640. The localization module 640 may be similar to, and can incorporate all of the functionality and structure of, the localization module 314 described herein. The localization module 640 can utilize the left lane index value and the right lane index value, along with any other input data of the lane analysis module (e.g., the LiDAR system data 604, the visual system data 606, the GNSS system data 608, and the IMU system data 609, etc.) to localize the autonomous vehicle. For example, the localization module 640 can localize the autonomous vehicle by correlating the lane index values (and in some embodiments, the lane offset values generated by the lane offset module 312 as described herein) with longitudinal position data using, for example, the localization module 314. The longitudinal position data may be generated based on one or more of, for example, the GNSS system data 608 and the IMU system data 609. Localizing the autonomous vehicle can include generating an accurate lateral position based on the lane index and/or offset and an accurate, longitudinal position based on the GNSS and the IMU. To localize the autonomous vehicle, the localization module may perform any of the functionality described in connection with step 508 of FIG. 5.

In an embodiment, the lane analysis module 600 can include one or more road analysis models 630, which may include any type of machine learning or artificial intelligence model (e.g., a neural network, a CNN, a regression model, etc.). The one or more road analysis models 630 may be trained to receive any of the input data of the lane analysis module 600 (e.g., the LiDAR system data 604, the visual system data 606, the GNSS system data 608, and the IMU system data 609, etc.) as input, and to generate various characteristics of the roadway as output.

For example, the one or more road analysis models 630 may be trained to output one or more of a road width of the roadway, a total number of lanes of the roadway, respective distances from respective shoulders, lane width of one or more lanes of the roadway, shoulder width of the roadway, a classification of the type of road, a classification of whether there is an intersection in the roadway, and classifications of lane line types around the autonomous vehicle on the roadway (e.g., solid lane lines, dashed lane lines, etc.). The one or more road analysis models 630 can be trained by a server or computing system using the various supervised or supervised learning techniques described herein. For example, the one or more road analysis models 630 can be trained using image data as input and ground truth labels corresponding to the type of output(s) that the one or more road analysis models 630 are trained to generate.

FIG. 7 is a flowchart diagram of an example method generating a map layer, according to an embodiment. The steps of the method 700 of FIG. 7 may be executed, for example, by any of the processors, servers, or autonomous vehicles described in connection with the system 100, 200, the controller 300, or the lane analysis module 600, according to some embodiments. The method 700 shown in FIG. 7 comprises execution steps 710-730. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 700 of FIG. 7 is described as being performed by a server, which may include the server systems 210 depicted in FIG. 2. However, it should be understood that any device or system with one or more processors, may perform the steps of the method 700, including the controller 300 depicted in FIG. 3 and the lane analysis module 600 depicted in FIG. 6. However, in some embodiments, one or more of the steps may be performed by a different processor, server, or any other computing device. For instance, one or more of the steps may be performed via a cloud-based service including any number of servers, which may be in communication with the processor of the autonomous vehicle and/or its autonomy system. Although the steps are shown in FIG. 7 have a particular order, it is intended that the steps may be performed in any order. It is also intended that some of these steps may be optional.

At step 710, a server (e.g., the server system 210) may identify radar data captured by one or more autonomous vehicles (e.g., the vehicle 102) when one or more autonomous vehicles were positioned in respective lanes of one or more roadways. The server can further identify respective ground truth localization data of at least one autonomous vehicle representing the position of the autonomous vehicle on the roadway when the set of image data was captured. In an embodiment, the ground truth localization data can include multiple locations of the autonomous vehicle, with each or position within the roadway corresponding to a respective image in the set of image data. The radar data may include LiDAR images (e.g., collections of LiDAR points, a point cloud, etc.) captured by LiDAR sensors of the autonomous vehicle or visual images (e.g., images, video frames) captured by cameras of the autonomous vehicle. To obtain the image data, steps similar to those described in connection with step 402 of FIG. 4 may be performed.

Even though aspects of the present application discuss radar data in terms of images, it is understood that the methods and systems discussed herein apply to all radar data in any form. For consistency and ease of description, the present disclosure will discuss radar data in terms of images and analyzing images.

The ground truth localization data may be identified as stored in association with the set of image data received from one or more autonomous vehicles. The ground truth localization may include a relative and/or absolute position (e.g., GPS coordinates, latitude/longitude coordinates, etc.) and may be obtained separately or contemporaneously with the image data. In some embodiments, portions of the ground truth localization data may represent the ground truth location of the vehicle capturing the image data at the time the image was captured. For example, while capturing LiDAR or camera images or video frames, the autonomous vehicle may capture highly accurate GNSS data (e.g., using the GNSS 108). In some embodiments, the server can generate a confidence value for one or more of the ground truth information sources, and the ground truth information sources may be selected based on the confidence values. Identifying the ground truth localization data may include retrieving the ground truth localization data from a memory or database, or receiving the ground truth localization data from one or more autonomous vehicles that captured the set of image data. In an embodiment, at least a portion of the ground truth localization data may include data derived from an HD map. For example, localization of the autonomous vehicle may be determined based on one or more lane indications in the set of image data that are defined at least in part as a feature on a raster layer of the HD map, as described herein. Identifying the ground truth localization data can include any of the operations described in connection with step 404 of FIG. 4.

At step 720, the server may determine and filter out moving objects from the set of image data received in the step 710. Using the radar data, the server may determine one or more objects near the autonomous vehicle. For instance, the server may execute a target detection and tracking protocol to identify various shapes of objects (e.g., near the roadway). Radar systems collect data on the reflected signals from objects in their field of view. The server may then analyze that data to determine the presence and characteristics of these objects, such as the objects' size, radar cross-section, shape, distinguishing features, classification, location, and other physical characteristics. In some embodiments, the server may apply various processing protocols, such as filtering out the noise, applying signal processing techniques to enhance the data, and extracting features that help in object identification.

In a non-limiting example, the server may analyze the radar data received and may filter out certain objects. For instance, the server may filter out moving objects or objects that are not permanent fixtures, such as vehicles, bicycles, and the like. The server may apply various analytical protocols to determine whether an object is moving, such as using the Doppler effect. The Doppler effect is a phenomenon in which the frequency of waves changes when the source of the waves and the observer are in relative motion. When radar waves encounter an object, they bounce back (reflect) toward the radar system. If the object is stationary, the reflected waves have the same frequency as the transmitted waves. However, if the object is moving, the frequency of the reflected waves changes due to the Doppler effect. Using this method, the server may determine which object is stationary and which objects are moving.

Using these methods, the server may identify the objects that are moving and ignore (filter out) those objects. As a result, the server may identify permanent fixtures, such as billboards, lane lines, traffic signs, and the like.

In some embodiments, the server may filter out other objects identified using the radar data in accordance with their size and/or shape. For instance, if an object is identified to be smaller (in height, width, and/or depth) than a threshold, the object may be eliminated (filtered out). In other examples, the server may filter out objects that have a shape that matches a predetermined shape. For instance, the server may use data captured by radar to identify a traffic cone within a roadway. The traffic cone may be identified as a non-moving object that satisfies a size threshold. However, the server may filter out the traffic cone because its shape matches a predetermined shape (traffic cone). Using this method, certain object, such as traffic or temporary signage can be filtered out.

At step 730, the server may generate a map layer including the filtered set of radar data. The server may generate a dataset corresponding to the permanent objects identified via the radar data. After the objects identified have been filtered out, the server may generate a dataset that indicates various data points corresponding to the remaining objects (e.g., non-moving objects). The dataset may include an indication of the location of the object and the characteristics of the object.

The server may then generate a map layer using the dataset, such as a digital layer to an HD map. An HD map layer refers to a specific component or level of detail within a digital map that can provide highly accurate and precise information about a geographic location.

The new map layer may represent the generated dataset and may be designated as the "radar-detected objects." The layer may include data indicating road geometry, lane boundaries, traffic signs, traffic lights, landmarks, objects near the roadway, or other relevant features. The layer may also contain detailed information and attributes related to each radar-detected object. For example, the layer may include the exact location of lanes, lane widths, curvature, and elevation data. In another example, the layer may include the shape, elevation, and other physical characteristics of a billboard.

The server may store the layer as a separate dataset within an HD map system. In some embodiments, the server may segregate different characteristics into different layers and save them separately. For instance, one layer may include road/lane characteristics; another layer may include characteristics of billboards around. Therefore, discussing a single layer in an HD map system is not limited to the methods and systems discussed herein.

In some embodiments, the server may also include other sensor data, such as location data, such that the exact location of the objects can be determined. Using the localization data discussed herein and/or other location-tracking protocols, the server may determine a location for one or more objects identified using the radar data. As a result, the map later generated by the server may also include the location of the object.

Figure 8:
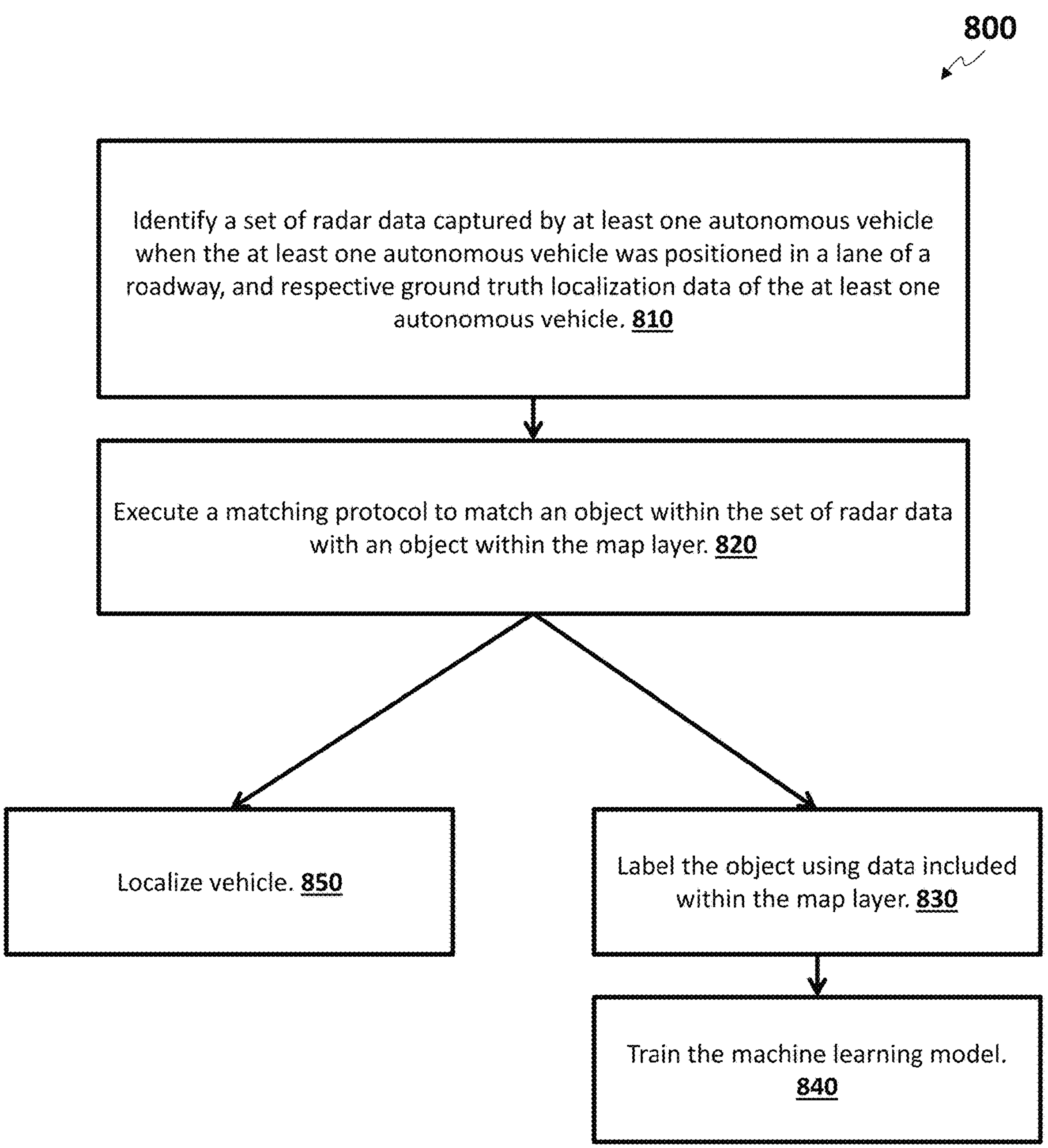
FIG. 8 is a flowchart diagram of an example method of generating an automatic label for a training dataset and training a machine learning model, according to an embodiment.

FIG. 8 is a flowchart diagram of an example method of generating an automatic label for a training dataset and training a machine learning model, according to an embodiment. The steps of the method 800 of FIG. 8 may be executed, for example, by an autonomous vehicle system, including vehicle 102, the controller 300, or the lane analysis module 600, according to some embodiments. The method 800 shown in FIG. 8 comprises execution steps 810-830. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 800 of FIG. 8 is described as being performed by an autonomous vehicle system (e.g., the vehicle 102, the controller 300, the lane analysis module 600, etc.). However, in some embodiments, one or more of the steps may be performed by a different processor(s) or any other computing device. For instance, one or more of the steps may be performed via a cloud-based service or another processor in communication with the processor of the autonomous vehicle and/or its autonomy system. Although the steps are shown in FIG. 8 as having a particular order, it is intended that the steps may be performed in any order. It is also intended that some of these steps may be optional.

In an embodiment, the method 800 of FIG. 8 may be executed to train one or more machine learning models (e.g., the one or more road analysis model 630) using that is automatically labeled.

At step 810, the server may identify a set of image data captured by at least one autonomous vehicle when the at least one autonomous vehicle was positioned in a lane of a roadway and the respective ground truth localization data of the at least one autonomous vehicle. The server may receive a second set of radar data from a second vehicle (other than the vehicle generating the radar data discussed in FIG. 7 or the same vehicle at a different time).

The autonomous vehicle system of an autonomous vehicle can identify image data indicative of a field of view from the autonomous vehicle when the autonomous vehicle is positioned in a lane of a multi-lane roadway. The image data may include LiDAR images (e.g., collections of LiDAR points, a point cloud, etc.) captured by LiDAR sensors of the autonomous vehicle or visual images (e.g., images, video frames) captured by cameras of the autonomous vehicle. To identify the image data, steps similar to those described in connection with step 502 of FIG. 5 may be performed. The image data may be captured by one or more cameras or sensors of the autonomous vehicle, and stored in memory of the autonomous vehicle system for processing, in a non-limiting example. In an embodiment, the steps of the method 800 may be performed upon capturing additional image data during the operation of the autonomous vehicle on the multi-lane roadway.

At step 820, the server may execute a matching protocol to match an object within the set of image data with an object within the map layer. The server may execute various analytical protocols using the data received in the step 810. As a result, the server may determine a set of objects associated with the data received in the step 810. The server may then match a location of the data received in step 810 with the location of the data received in the step 710. As a result, the server may then retrieve a map overlay associated with the location of the vehicle transmitting the data discussed in the step 810. The server may compare the map layer to the objects identified using the data received in the step 810. As a result, the server may identify matching objects.

At step 830, the server may label the object using data included within the map layer. Labeling the data can include associating each image with the respective object with a matching object within the map layer. Using the labeling, the server may generate a training dataset. The labeling may include performing steps similar to those described in connection with step 408 of FIG. 4. In an embodiment, the server can allocate a portion of the training data as an evaluation set, which may not be utilized for training but may be utilized to evaluate the performance of machine learning models trained using the training data described herein.

At step 840, the server can train, using the labeled data, machine learning models that can predict attributes used to autonomously navigate an autonomous vehicle. For instance, the trained machine learning model can use the labeled images to predict a lane width for another vehicle and/or generate a left lane index value and a right lane index value as output. The machine learning models may be similar to the machine learning models 218 described herein and may include one or more neural network layers (e.g., convolutional layers, fully connected layers, pooling layers, activation layers, normalization layers, etc.). Training the machine learning models can include performing operations similar to those described in connection with step 410 of FIG. 4.

The machine learning models can be trained using supervised and/or unsupervised training techniques. For example, using a supervised learning approach, the machine learning models may be trained using providing training data and labels corresponding to the training data (e.g., as ground truth). The training data may include a respective label for each of the machine-learning models for a given input image. During training, the machine learning models may be provided with the same input data but may be trained using different and respective labels.

During training, input image data can be propagated through each layer of the machine learning models until respective output values are generated. The output values can be utilized with the respective left and right ground truth labels associated with the input image data to calculate respective loss values for the machine learning models. Some non-limiting example loss functions used to calculate the loss values include mean squared error, cross-entropy, and hinge loss. The trainable parameters of the machine learning models can then be modified according to their respective loss values using a backpropagation technique (e.g., gradient descent or another type of optimizer, etc.) to minimize the loss values.

In an embodiment, the server can evaluate the machine learning models based on the set of training data allocated as an evaluation set. Evaluating the machine learning models can include determining accuracy, precision and recall, and F1 score, among others. The machine learning models can be iteratively trained until a training termination condition (e.g., a maximum number of iterations, a performance threshold determined using the evaluation dataset, a rate of change in model parameters falling below a threshold, etc.) has been reached. Once trained, the machine learning models can be provided to one or more autonomous vehicles for execution during the operation of the autonomous vehicle.

In addition to or alternative to executing the step 840, the server may also execute the step 850 in which the server localizes a vehicle using the map layer. For instance, when a vehicle is on a roadway, the server may match the vehicle's radar data (specifically, object identified using the vehicle's radar data) to an object within the map layer.

In one example, the autonomous vehicle system may localize the autonomous vehicle by correlating the longitudinal position data of the autonomous vehicle, which may be generated based on one or more of, for example, a GNSS system of the autonomous vehicle or an IMU system of the autonomous vehicle and one or more of the objects detected with the map layer.

Figure 9A:
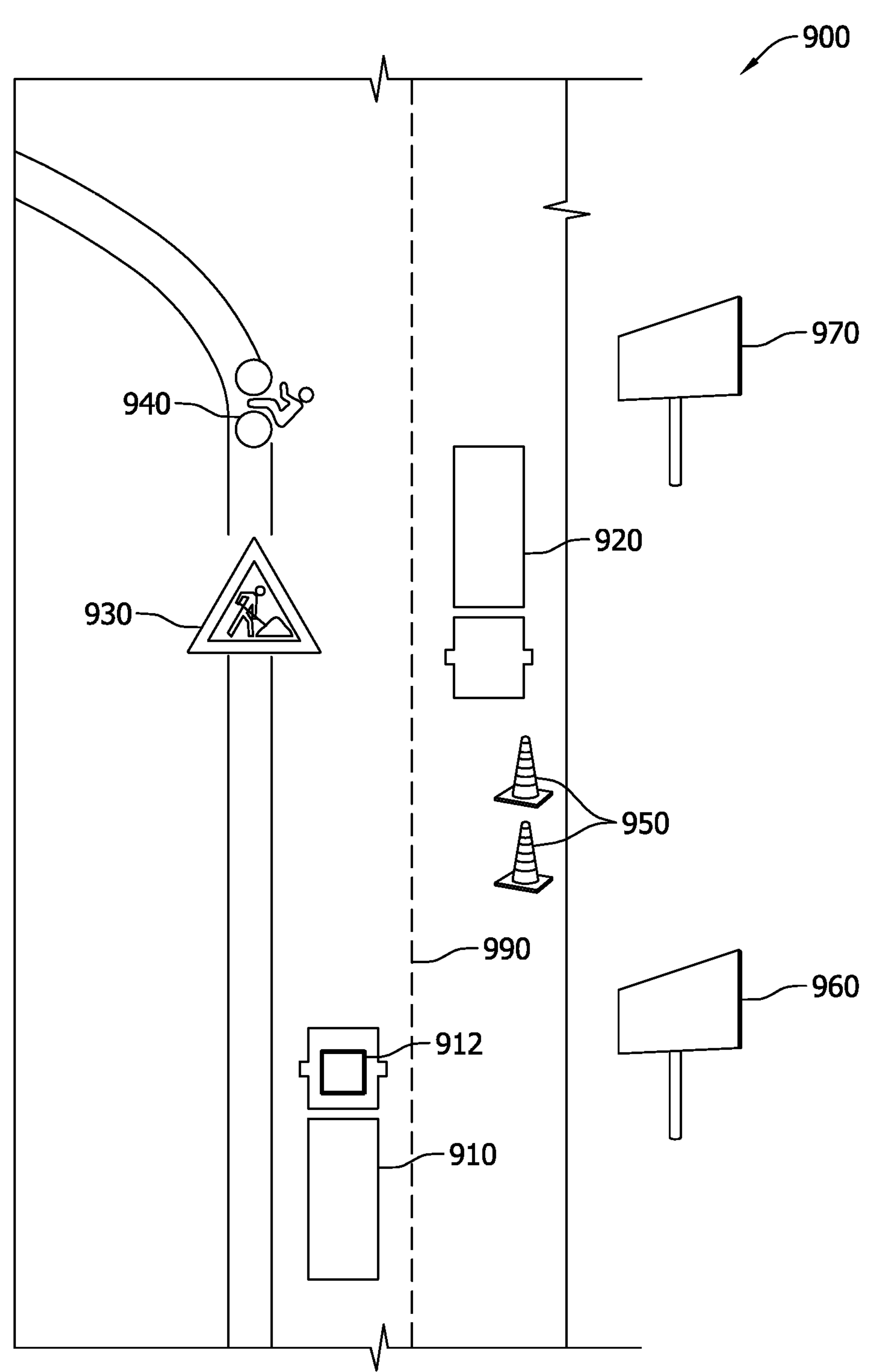
FIGS. 9A-B illustrate an example of implementing the methods discussed herein, according to an embodiment.

FIG. 9 depicts a bird's-eye view of roadway scenario 900, including a schematic representation of an autonomous vehicle 910 and various objects surrounding the autonomous vehicle 910. The roadway scenario 900 includes a two-lane roadway with traffic flow in two directions (autonomous vehicle 910 and oncoming vehicle 920). The roadway scenario 900 may also include a bike lane with a cyclist 940.

In the depicted example, the autonomous vehicle 910 contains an autonomy system 912 configured to use various sensors (e.g., LiDAR) to collect radar data surrounding the autonomous vehicle 910. A server may then analyze the radar data generated by the autonomous vehicle 910 and identify the billboards 960 and 970; the traffic sign 930; cyclist 940; vehicle 920; traffic cones 950; and lane line 990. Using the methods discussed herein, the server may filter out the cyclist 940 and the vehicle 920 due to the fact that they are moving objects (and not permanent landmarks). Moreover, the server may eliminate the traffic cones 950 because they have a shape consistent with traffic signage. The server then generates a map layer comprising the billboards 960-970, traffic sign 930, and lane line 990. The map layer may also include locations associated with each object.

Figure 9B:
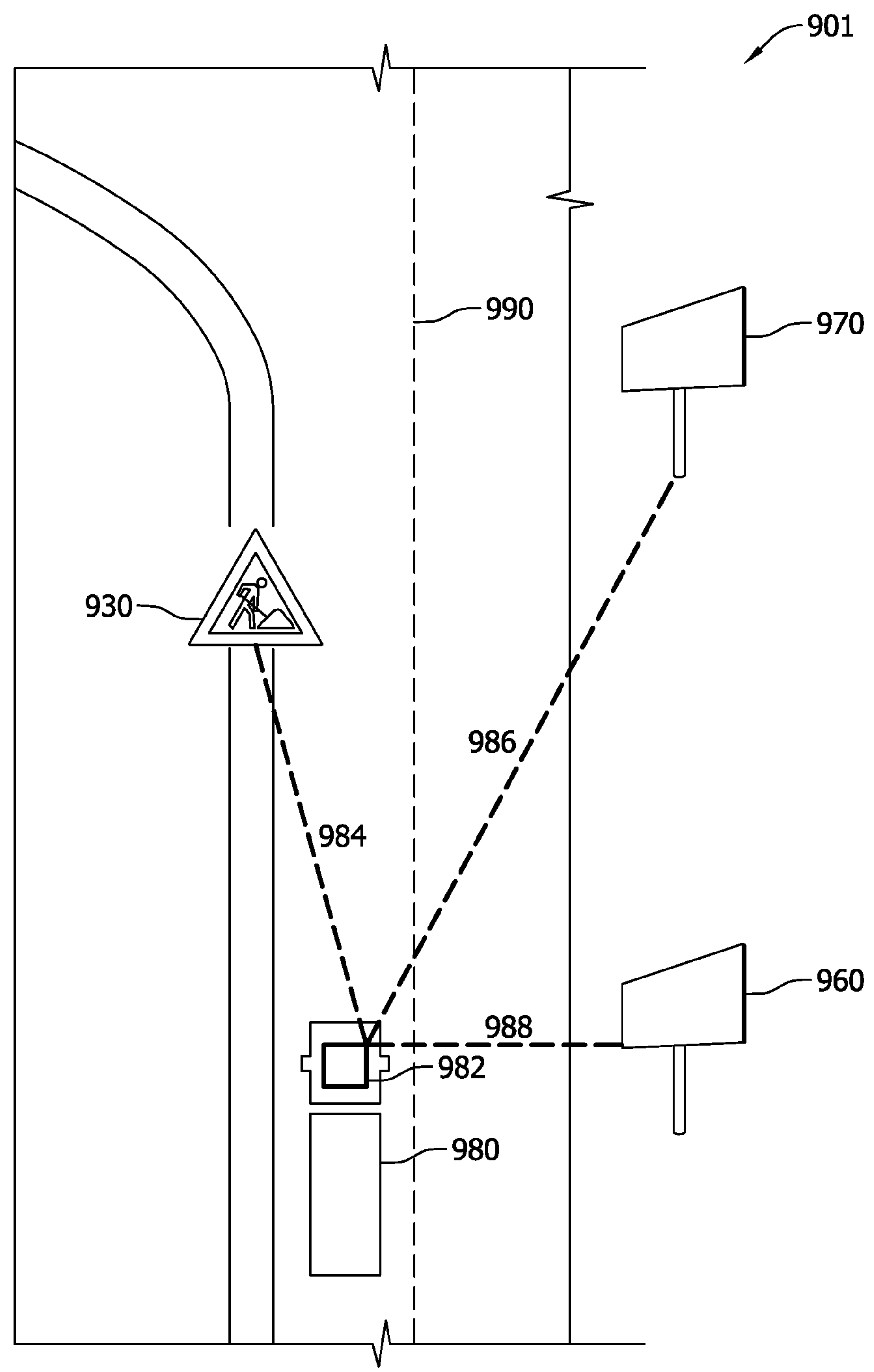

At a later time, as depicted in FIG. 9B, another autonomous vehicle 980 having an autonomy system 982 may travel the same roadway. The server may receive radar data from the autonomous vehicle 980 and determine the traffic sign 930 and billboards 960-970. The server may then match the identified objects with the map layer generated and discussed in FIG. 9A. Using this data, the server may label the objects within the map layer. For instance, the billboard 960 may be labeled as a billboard and its location may also be confirmed because two separate autonomous vehicles' radar data corroborate this information. The labeled data may be included within the training dataset and ultimately used to train one or more machine learning models.

Moreover, the server may use the layer map to localize the autonomous vehicle 980. For instance, the server may use the distances 984, 986, and 988 to localize the autonomous vehicle 980. Finally, using the identified lane line 990, the server may determine lane width or index values associated with the roadway.

When receiving data from a sensor to generate a map, the timing of the data received should be accounted for, such that the data is synched properly and the map is generated accurately. For instance, if an image or other radar data is not properly synced with the time that the image/radar data was captured, a map may not be accurate because the map must accurately reflect the position of the objects detected using radar data at the precise time it was captured. If the timing is not properly synced, the distances (calculated from the vehicle) may be incorrect. Therefore, even a small discrepancy in timing can cause subsequent technical issues. Many conventional software solutions attempt to sync the time-stamps by providing a retroactive software solution. However, using the method 1000, radar data can be synced to their corresponding time-stamp, such that efficiencies are created.

Figure 10:
FIG. 10 illustrates an example of time-syncing method for radar data, according to an embodiment.
Figure 10:
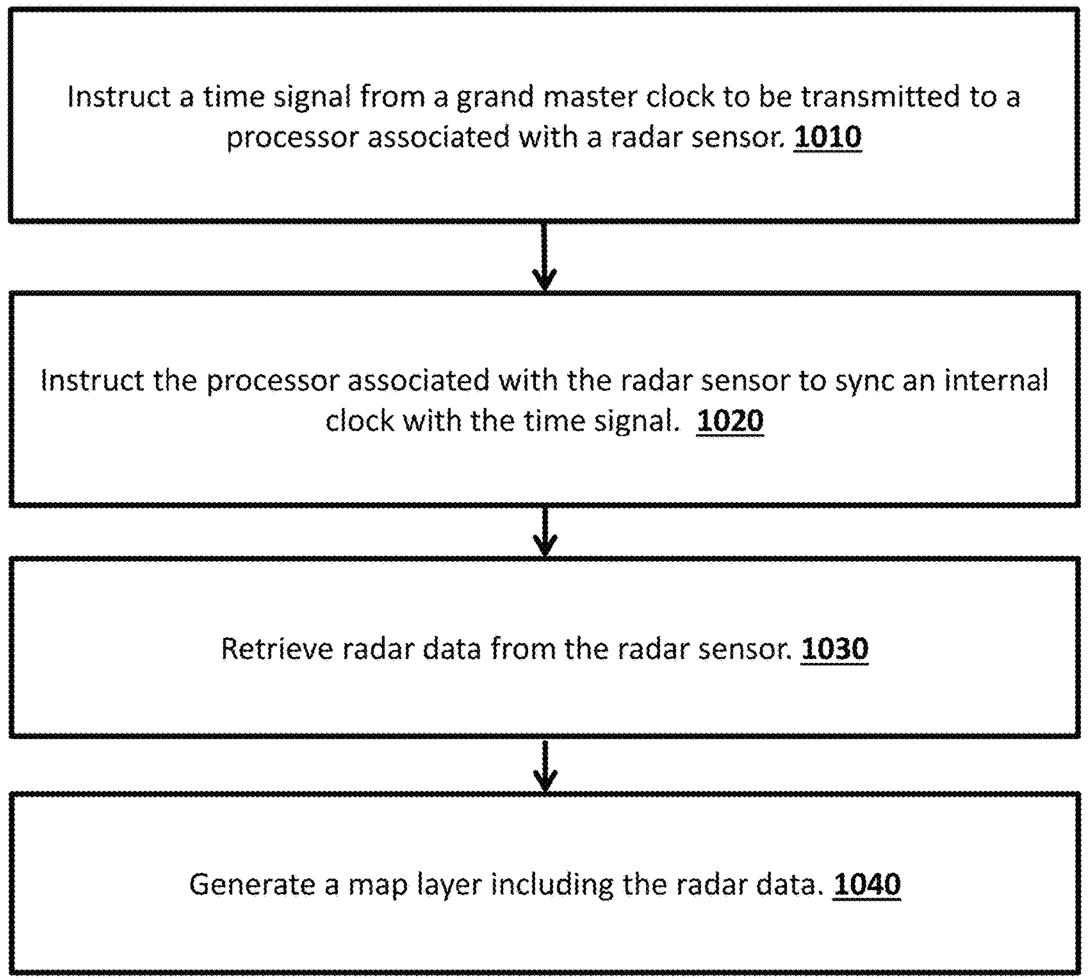

FIG. 10 is a flowchart diagram of an example method of generating an automatic label for a training dataset and training a machine learning model, according to an embodiment. The steps of the method 1000 of FIG. 8 may be executed, for example, by an autonomous vehicle system, including vehicle 102, and/or the controller 300, according to some embodiments. The method 1000 shown in FIG. 10 comprises execution steps 1010-1040. However, it should be appreciated that other embodiments may comprise additional or alternative execution steps, or may omit one or more steps altogether. It should also be appreciated that other embodiments may perform certain execution steps in a different order. Steps discussed herein may also be performed simultaneously or near-simultaneously with one another.

The method 1000 of FIG. 10 is described as being performed by an autonomous vehicle system (e.g., the vehicle 102 and/or the controller 300). However, in some embodiments, one or more of the steps may be performed by a different processor(s) or any other computing device. For instance, one or more of the steps may be performed via a cloud-based service or another processor in communication with the processor of the autonomous vehicle and/or its autonomy system. Although the steps are shown in FIG. 10 as having a particular order, it is intended that the steps may be performed in any order. It is also intended that some of these steps may be optional. In some embodiments, a processor of a radar sensor (e.g., LiDAR sensor) of an autonomous vehicle itself. Therefore, the processor of the radar sensor may directly sync its internal clock with the time signal discussed herein and transmit the radar data to the processor/server of the autonomous vehicle.

At step 1010, the processor may instruct a time signal from a grand master clock to be transmitted to a processor associated with a radar sensor. As used herein, a grand master clock, may refer to a highly accurate and precise clock. As discussed herein, the time signal generated by the grand master clock can be used to synchronize and/or control timekeeping in various systems, networks, and devices. That is, the time signal generated by the grand master clock can be used as a ground truth data point or a reference for other clocks, such as an internal clock of one or more sensors associated with the more autonomous vehicles. The grand master clock may rely upon a highly accurate timekeeping mechanism, such as an atomic clock or a GPS receiver, to maintain precise timekeeping. The grand master clock may use various protocols to generate a time signal, such as IRIG-B, SMPTE time code, Network Time Protocol (NTP), Precision Time Protocol (PTP), or GPS time.

The processor may identify a grand master clock and instruct the grand master clock to transmit a time signal to a processor of a radar detector associated with an autonomous vehicle. In some embodiments, the processor may also indicate a frequency of transmittal. For instance, the instructions may indicate that a time signal should be transmitted every second, every 5 seconds, or any other predetermined time period. In some embodiments, the processor may revise one or more configurations of the grand master clock and/or adjusts its parameters, such that the time signal is received.

In some embodiments, the grand master clock may transmit the time signal to the processor of the autonomous vehicle (instead of the processor of the radar sensor). In this way, the processor of the autonomous vehicle may sync one or more sensors as well and/or may incorporate the time signal within a map generated using the data retrieved from one or more sensors.

At step 1020, the processor may instruct the processor associated with the radar sensor to sync an internal clock with the time signal. The processor may instruct the processor of a radar sensor to sync its internal clock with the time signal received. The processor may first connect the grand master clock to the processor of the radar sensor. In a non-limiting example, the processor may establish a physical or network connection (e.g., wired or wireless) between the grand master clock and the processor of the radar sensor. The processor may then configure the radar sensor to sync its internal clock using the time signal received from the grand master clock. Moreover, the processor may instruct the processor of the radar sensor to adjust its internal clock accordingly.

At step 1030, the processor may retrieve radar data from the radar sensor. The processor may receive radar data from the sensor, e.g., as discussed herein, such as FIGS. 2-6. The radar data may indicate data associated with one or more objects near the radar sensor (e.g., within an autonomous vehicle). The radar data may also include a corresponding time stamp associated with the transmitted data. That is, the time stamp may indicate a time that the data was collected (not transmitted to the processor of the autonomous vehicle).

At step 1040, the processor may generate a map layer including the data received from the processor of the radar sensor. The processor may analyze and aggregate the radar data and generate a digital map that can be included as a map layer. The processor may use a variety of methods to generate the map/map layer including the methods and systems discussed herein, such as the ones discussed with respect to FIGS. 1-10.

Additionally or alternatively, the processor may sync one or more other sensors using the time signals. Moreover, the processor may incorporate the time signal and/or the time stamp received from the radar sensor into the map, such that the time signal can be used to identify various attributes included within the digital map.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various components, blocks, modules, circuits, and steps have been generally described in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

identifying, by a processor, a set of radar data captured by at least one autonomous vehicle when the at least one autonomous vehicle was positioned in a lane of a roadway, and respective ground truth localization data of the at least one autonomous vehicle;

filtering, by the processor, one or more objects identified via the set of radar data in accordance with an attribute of the one or more objects by:

determining at least one first object of the one or more objects is moving based on the set of radar data; and filtering the set of radar data into a set of filtered radar data by excluding the at least one first object of the one or more objects from the set of radar data;

generating, by the processor, a plurality of map layers to be included within a high definition map, based on the set of filtered radar data and the respective ground truth localization data of the at least one autonomous vehicle, generating the plurality of map layers further comprising segregating different characteristics of the one or more objects into separate layers in the plurality of map layers, wherein each map layer of the plurality of map layers is stored in a separate dataset;

identifying, by the processor, a second set of radar data captured by a second autonomous vehicle when the second autonomous vehicle was positioned in the lane of the roadway; and localizing, by the processor, the second autonomous vehicle by executing a matching protocol to match an object within the second set of radar data with an object within the plurality of map layers.

2. The method of claim 1, further comprising:

labeling, by the processor, the matched object using data included within the plurality of map layers.

3. The method of claim 2, further comprising:

training, by the processor, a machine learning model using at least one labeled data point.

4. The method of claim 1, wherein the one or more objects identified include at least one lane line.

5. The method of claim 1, wherein filtering the one or more objects further comprises:

determining at least one second object of the one or more objects meets at least one of i) matching a predetermined shape or ii) satisfying a size threshold; and filtering the set of radar data further comprising excluding the at least one second object of the one or more objects from the set of radar data.

6. A non-transitory machine-readable storage medium having computer-executable instructions stored thereon that, when executed by one or more processors, cause the one or more processors to perform operations comprising:

identifying, by a processor, a set of radar data captured by at least one autonomous vehicle when the at least one autonomous vehicle was positioned in a lane of a roadway, and respective ground truth localization data of the at least one autonomous vehicle;

filtering, by the processor, one or more objects identified via the set of radar data in accordance with an attribute of the one or more objects by:

determining at least one of the one or more objects is moving based on the set of radar data; and filtering the set of radar data into a set of filtered radar data by excluding the at least one of the one or more objects from the set of radar data;

generating, by the processor, a plurality of map layers to be included within a high definition map, based on the set of filtered radar data and the respective ground truth localization data of the at least one autonomous vehicle, generating the plurality of map layers further comprising segregating different characteristics of the one or more objects into separate layers in the plurality of map layers, wherein each map layer of the plurality of map layers is stored in a separate dataset;

identifying, by the processor, a second set of radar data captured by a second autonomous vehicle when the second autonomous vehicle was positioned in the lane of the roadway; and localizing, by the processor, the second autonomous vehicle by executing a matching protocol to match an object within the second set of radar data with an object within the plurality of map layers.

7. The non-transitory machine-readable storage medium of claim 6, wherein the attribute of the one or more objects corresponds to a predetermined shape of the one or more objects.

8. The non-transitory machine-readable storage medium of claim 6, wherein the attribute of the one or more objects corresponds to whether the one or more objects are moving.

9. The non-transitory machine-readable storage medium of claim 6, wherein the attribute of the one or more objects is a size threshold.

10. The non-transitory machine-readable storage medium of claim 6, wherein the instructions further cause the one or more processors to label the matched object using data included within the plurality of map layers.

11. The non-transitory machine-readable storage medium of claim 10, wherein the instructions further cause the one or more processors to train a machine learning model using at least one labeled data point.

12. The non-transitory machine-readable storage medium of claim 6, wherein the one or more objects identified include at least one lane line.

13. A system comprising a processor configured to:

identify, by a processor, a set of radar data captured by at least one autonomous vehicle when the at least one autonomous vehicle was positioned in a lane of a roadway, and respective ground truth localization data of the at least one autonomous vehicle;

filter, by the processor, one or more objects identified via the set of radar data in accordance with an attribute of the one or more objects by:

determining at least one first object of the one or more objects is moving based on the set of radar data; and filtering the set of radar data into a set of filtered radar data by excluding the at least one first object of the one or more objects from the set of radar data;

generate, by the processor, a plurality of map layers to be included within a high definition map, based on the set of filtered radar data and the respective ground truth localization data of the at least one autonomous vehicle, generating the plurality of map layers further comprising segregating different characteristics of the one or more objects into separate layers in the plurality of map layers, wherein each map layer of the plurality of map layers is stored in a separate dataset;

identify, by the processor, a second set of radar data captured by a second autonomous vehicle when the second autonomous vehicle was positioned in the lane of the roadway; and localize, by the processor, the second autonomous vehicle by executing a matching protocol to match an object within the second set of radar data with an object within the plurality of map layers.

14. The system of claim 13, wherein the attribute of the one or more objects corresponds to a predetermined shape of the one or more objects.

15. The system of claim 13, wherein the processor is further configured to label the matched object using data included within the plurality of map layers.

16. The system of claim 15, wherein the processor is further configured to train a machine learning model using at least one labeled data point.

17. The system of claim 13, wherein filter the one or more objects further comprises:

determine at least one second object identified from the set of filtered radar data satisfies a size threshold; and filter the set of filtered radar data by excluding the at least one second object.

* * * * *